(12) United States Patent
Gottschalk et al.

(10) Patent No.: US 6,284,830 B1
(45) Date of Patent: *Sep. 4, 2001

(54) MOLDING COMPOSITIONS COMPRISING RANDOM COPOLYAMIDES, THEIR USE, AND PROCESS FOR THEIR PREPARATION

(75) Inventors: Axel Gottschalk; Stefan Grutke, both of Neustadt; Gunter Pipper, Bad Dürkheim; Peter Wolf, Kirchheim; Martin Weber, Maikammer, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,554

(22) Filed: Jul. 15, 1998

(30) Foreign Application Priority Data

Jul. 21, 1997 (DE) .............................................. 19731230.6

(51) Int. Cl.[7] .................................................... C08L 77/00
(52) U.S. Cl. .................. 524/449; 524/504; 524/508; 524/511; 524/514; 525/66; 525/92 B; 525/133
(58) Field of Search .................................... 525/92 B, 66, 525/133; 524/449, 508, 511, 504, 514

(56) References Cited

U.S. PATENT DOCUMENTS 5,397,838 * 3/1995 Ohtomo et al ......................... 525/92

FOREIGN PATENT DOCUMENTS

| 2 122 735 | 5/1970 | (DE) . |
| 41 21 705 | 1/1993 | (DE) . |
| 43 21 247 | 1/1994 | (DE) . |
| 333408 | 9/1989 | (EP) . |
| 477 757 | 4/1992 | (EP) . |
| 654 505 | 5/1995 | (EP) . |
| 678 555 | 10/1995 | (EP) . |
| 694 583 | 1/1996 | (EP) . |
| 722 986 | 1/1996 | (EP) . |
| 722 986 | 7/1996 | (EP) . |
| 07189029 | 7/1995 | (JP) . |

OTHER PUBLICATIONS

JP Abstract 80 062 958.
JP Abstract 931 339 494.
J. Polymer Sci., vol. 8, 3089–3111 (1970) Ridgway.
Patent Abst. of Japan, vol. 19, No. 377 (C–1225) , Jul. 15, 1994 (JP 06100775, 4/12/94).

* cited by examiner

Primary Examiner—Ana Woodward
(74) Attorney, Agent, or Firm—Keil & Weinkauf

(57) ABSTRACT

The molding composition comprises components A, B and, if desired, components C to E, the total weight of which is 100% by weight:

a: as component A, from 5 to 95% by weight of a random copolyamide made from
  a1: from 95.1 to 99.9% by weight of component A1 made from equimolar amounts of at least one linear aliphatic diamine and at least one linear aliphatic dicarboxylic acid
  a2: from 0.1 to 4.9% by weight of component A2 made from equimolar amounts of at least one linear aliphatic diamine and isophthalic acid
b: from 5 to 95% by weight of a copolymer component B, different from component A, selected from:
  b1: component B1 made from at least one, if desired, modified, polyarylene ether, or
  b2: component B2 made from, as component B21, from 60 to 99% by weight of at least one polyolefin homo- or copolymer and, as component B22, from 1 to 40% by weight of at least one modified polyolefm homo- or copolymer, or
  b3: component B3 made from, as component B31, from 70 to 100% by weight of at least one SAN, ABS or ASA polymer and, as component B32, from 0 to 30% by weight of at least one modified SAN, ABS or ASA polymer
c: as component C, from 0 to 20% by weight of at least one impact modifier
d: as component D, from 0 to 50% by weight of at least one filler
e: as component E, from 0 to 20% by weight of customary additives.

16 Claims, No Drawings

MOLDING COMPOSITIONS COMPRISING RANDOM COPOLYAMIDES, THEIR USE, AND PROCESS FOR THEIR PREPARATION

The invention relates to molding compositions comprising random copolyamides, a process for their preparation, their use for producing moldings, fibers or films, and moldings, fibers or films produced therefrom.

A wide variety of polyamide molding compositions, in particular in the form of polymer blends, is known, and in these the formulation of the molding compositions is matched to their desired property spectrum. In the case of glass-fiber-reinforced polyamide molding compositions in particular, it should be possible, besides advantageous mechanical properties, also to achieve a lustrous and smooth surface of the moldings produced therefrom. This should not impair the processing properties of the molding compositions, but in the case of glass-fiber-reinforced injection-molded materials, the surface of the moldings is frequently matt and rough because of unevenness, irregularities and the effect known as glass-fiber effect, and this is generally undesirable in visible moldings, which often influence the design of an article.

DE-C-43 21 247 describes polyamide resin compositions which, besides hexamethylene adipamide units made from adipic acid and hexamethylenediamine, also contain from 10 to 25% by weight of a hexamethylene isophthalamide made from isophthalic acid and hexamethylenediamine. The resin compositions also contain from 5 to 70% by weight of at least one inorganic filler, in particular glass fibers. The molding compositions are claimed to be homogeneous and to have good forming properties and high surface gloss, coupled with high strength, stiffness and dimensional stability. High surface gloss was a particular aim in these molding compositions.

JP-A 80/062 958 describes mixtures of polyamides and from 5 to 50% by weight of inorganic fibrous reinforcing materials. The polyamides here may have from 30 to 100% by weight of hexamethylene isophthalamide units. Hexamethylene isophthalamide polymers, hexamethylene isophthalamide-hexamethylene terephthalamide copolymers and hexamethylene isophthalamide-caproamide copolymers are in particular described.

JP-A 93/339 494 describes resin formulations having high strength and stiffness, low water absorption and good appearance. They comprise, for example, 20% by weight of a semiaromatic polyamide resin made from 50% by weight of hexamethylene adipamide units made from adipic acid and hexamethylenediamine, 30% by weight of hexamethylene isophthalamide units made from isophthalic acid and hexamethylenediamine and 20% by weight of hexamethylene terephthalamide units made from terephthalic acid and hexamethylenediamine, besides 80% by weight of a polyphenylene ether resin.

J. S. Ridgway, in J. Polym. Sc. Vol. 8, Part A-1, (1970), pages 3089 to 3111 describes structure-property relationships of nylon-6,6 copolyamides which contain ring structures. The ring structure was correlated here with the glass transition temperature and the melting point. Copolyamides are described which are based on adipic acid and hexamethylenediamine and contain from 10 to 30 mol % of isophthalic acid units.

WO 91/13194 describes improved starting materials for producing nylon yarns, for example random copolymers made from 87% by weight of adipic acid/hexamethylenediamine and 13% by weight of isophthalic acid/hexamethylenediamine, or 92% by weight of adipic acid/hexamethylenediamine and 8% by weight of isophthalic acid/hexamethylenediamine. From these, it is possible to obtain good yarns for carpet production.

EP-A-0 654 505 discloses high-molecular-weight thermoplastic molding compositions which are obtainable by incorporating a polyphenylene ether, is besides other additives and processing aids, into a melt of a low-molecular-weight polyamide, followed by post-condensation in the solid phase. The polyamides used were nylon-6,6 having a viscosity number in the range from 60 to 283 and a nylon-6/6,T having a viscosity number of 125.

EP-A-0 678 555 relates to thermoplastic molding compositions which comprise a partly aromatic, partially crystalline copolyamide and a polyphenylene ether. The copolyamide is built up from 30 to 44 mol % of terephthalic acid, from 6 to 20 mol % of isophthalic acid, from 43 to 49.5 mol % of hexamethylenediamine and from 0.5 to 7 mol % of aliphatic cyclic diamines.

EP-A-0 694 583 relates to thermoplastic molding compositions made from a partially crystalline, partly aromatic polyamide, polyolefin homo- or copolymers and compatibilizers. The copolyamide is built up from 30 to 44 mol % of terephthalic acid, from 6 to 20 mol % of isophthalic acid, from 43 to 49 mol % of hexamethylenediamine and from 0.5 to 7 mol % of aliphatic cyclic diamines.

EP-A-0 722 986 relates to thermoplastic molding compositions made from a partly aromatic, partially crystalline copolyamide, ASA or ABS or SAN polymers or $C_1$–$C_{18}$-alkyl (meth)acrylates and a compatibilizer. The copolyamide itself is built up from 30 to 44 mol % of terephthalic acid, from 6 to 20 mol % of isophthalic acid, from 43 to 49.5 mol % of hexamethylenediamine and from 0.5 to 7 mol % of aliphatic cyclic diamines.

DE-A-2 122 735 relates to a thermoplastic polymer mixture of an aromatic polysulfone and a polyamide. It is stated that the mixtures have desirable combinations of physical properties, although mixtures of different polymeric substances are usually mechanically weak.

EP-A-0 477 757 relates to polymer blends of polyaryl ether sulfones and polyamides, the polyamides having at least 50% by weight of recurring units of 1,6-hexamethylene terephthalamide. Besides good thermal properties and compatibility of the individual phases, the blends are claimed also to have a desirable combination of mechanical properties.

DE-A-41 21 705 relates to thermoplastic molding compositions based on polyarylene ethers and partly aromatic copolyamides. It is stated that mixtures of this type have excellent stiffness and high heat resistance.

DE-A-44 29 107 relates to molding compositions made from polyarylene ethers and copolyamides which have been built up from terephthalic acid, isophthalic acid, hexamethylenediamine and aliphatic cyclic diamines.

Besides high stiffness and heat resistance, the molding compositions are claimed to have good stability during processing.

The known molding compositions, in particular polyamide blends, do not have surface properties adequate for all applications, combined with good mechanical properties.

It is an object of the present invention to provide molding compositions comprising copolyamides, in particular copolyamide blends, which, besides very good mechanical properties, have very good surface quality and avoid the disadvantages of the known molding compositions. In particular, they should have high elongation at break and high modulus of elasticity. Their mechanical properties should be retained even after exposure to heat.

We have found that this object is achieved by providing a molding composition comprising components A, B and, if desired, components C to E, the total weight of which is 100% by weight:

a: as component A, from 5 to 95% by weight of a random copolyamide made from
  a1: from 95.1 to 99.9% by weight of component A1 made from equimolar amounts of at least one linear aliphatic diamine and at least one linear aliphatic dicarboxylic acid
  a2: from 0.1 to 4.9% by weight of component A2 made from equimolar amounts of at least one linear aliphatic diamine and isophthalic acid
b: from 5 to 95% by weight of a copolymer component B, different from component A, selected from:
  b1: component B1 made from at least one, if desired modified, polyphenylene ether, or
  b2: component B2 made from, as component B21, from 60 to 99% by weight of at least one polyolefin homo- or copolymer and, as component B22, from 1 to 40% by weight of at least one modified polyolefin homo- or copolymer, or
  b3: component B3 made from, as component B31, from 70 to 100% by weight of at least one SAN, ABS or ASA polymer and, as component B32, from 0 to 30% by weight of at least one modified SAN, ABS or ASA polymer
c: as component C, from 0 to 20% by weight of at least one impact modifier
d: as component D, from 0 to 50% by weight of at least one filler
e: as component E, from 0 to 20% by weight of customary additives.

From the novel molding compositions, it is possible to produce moldings which have very good processing properties and very good mechanical properties, even after repeated exposure to heat, and when combined with fillers, such as glass fibers, in particular in glass-fiber-reinforced injection-molded materials, have a very smooth surface with high gloss.

It has been found that molding compositions in which the copolyamides used have, for example, besides a component A1 made from equimolar amounts of hexamethylenediamine and adipic acid, from 0.1 to 4.9% by weight of a component A2 made from equimolar amounts of, for example, hexamethylenediamine and isophthalic acid, have these properties. The mechanical and surface properties after repeated exposure to heat are improved, in particular in comparison with molding compositions which have a higher proportion of component A2 (cf. DE-C-43 21 247).

The components of the novel molding compositions are described below. The total amount or total weight here of components A, B and, if present, C to E, is 100% by weight.

Component A

Component A is present in the novel molding compositions in an amount of from 5 to 95% by weight, preferably from 15 to 70% by weight, in particular from 30 to 50% by weight.

Component A is a random copolyamide made from 95.1 to 99.0% by weight, preferably from 95.1 to 98.5% by weight, in particular from 95.3 to 97.5% by weight, especially from 95.5 to 97.0% by weight, of component A1 and from 0.1 to 4.9% by weight, preferably from 1.5 to 4.9% by weight, in particular from 2.5 to 4.7% by weight, especially from 3.0 to 4.5% by weight, of component A2.

Component A1

Component A1 consists of equimolar amounts of at least one linear aliphatic diamine and at least one linear aliphatic dicarboxylic acid. The linear aliphatic diamines preferably used are diamines of the formula $H_2N-(CH_2-)_xNH_2$, in which x is an integer in the range from 4 to 20, preferably from 4 to 12, in particular from 4 to 8. Hexamethylenediamine is particularly preferred.

Linear aliphatic dicarboxylic acids preferably used are dicarboxylic acids of the formula $HOOC-(CH_2-)_yCOOH$, in which y is an integer in the range from 4 to 20, preferably from 4 to 12, in particular from 4 to 8. Adipic acid is particularly preferred.

It is possible to use mixtures of linear aliphatic diamines. However, it is preferable to use only one linear aliphatic diamine. It is likewise possible to use mixtures of linear aliphatic dicarboxylic acids. It is likewise preferable to use only one linear aliphatic dicarboxylic acid.

Component A2

Component A2 consists of equimolar amounts of at least one linear aliphatic diamine and isophthalic acid. The linear aliphatic diamine here can have the structure stated above for component A1. The linear aliphatic diamine is preferably the linear aliphatic diamine of component A1. Hexamethylenediamine is particularly preferred. It is possible to use mixtures of more than one linear aliphatic diamine, but it is preferable to use only one linear aliphatic diamine.

The viscosity number of component A is preferably in the range from 70 to 300, particularly preferably from 100 to 250, in particular from 100 to 150. The viscosity number here is determined at 25° C. as 0.5% strength by weight solution in 96% strength by weight sulfuric acid.

Component B

The proportion of component B in the novel molding compositions is from 5 to 95% by weight, preferably from 15 to 55% by weight, particularly preferably from 25 to 35% by weight. If component D is present in an amount of from 5 to 50% by weight, the proportion of component B is then generally from 5 to 90% by weight.

If component C is present in an amount of from 1 to 20% by weight, the proportion of component B is then generally from 5 to 94% by weight, and if component D is present in an amount of from 5 to 50% by weight, and component C is present in an amount of from 1 to 20% by weight, the proportion of component B is then generally from 5 to 93% by weight.

Component B is selected from:

Component B1 made from at least one, if desired modified, polyphenylene ether, or Component B2 made from, as component B21, from 60 to 99% by weight, preferably from 70 to 90% by weight, particularly preferably from 75 to 85% by weight, of at least one polyolefin homo- or copolymer and, as component B22, from 1 to 40% by weight, preferably from 10 to 30% by weight, particularly preferably from 15 to 25% by weight, of at least one modified polyolefin homo- or copolymer, or Component B3 made from, as component B31, from 70 to 100% by weight, preferably from 75 to 100% by weight, particularly preferably from 80 to 100% by weight, of at least one SAN, ABS or ASA polymer and, as component B32, from 0 to 30% by weight, preferably from 0 to 25% by weight, particularly preferably from 0 to 20% by weight, of at least one modified SAN, ABS or ASA polymer.

Component B 1

Examples of possible polyarylene ethers are mixtures of from 0 to 50% by weight of at least one anhydride-terminated polyarylene ether B1a and from 50 to 100% by weight of at least one polyarylene ether B1b, different from component B1a.

B1a has recurring units of the formula (III)

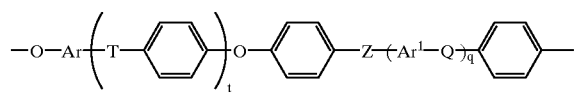

(III)

where each of t and q may be an integer 0, 1, 2 or 3, each of T, Q and Z is a chemical bond or a group selected from the class consisting of —O—, —S—, —SO$_2$—, S=O, C=O, —N=N—, —R$^a$C=CR$^b$— and —CR$^c$R$^d$— with the proviso that at least one of the groups T, Q or Z is —SO$_2$— or C=O, and if t and q are 0, Z is —SO$_2$— or C=O, each of R$^a$ and R$^b$ is hydrogen or C$_1$–C$_{10}$-alkyl, each of R$^c$ and R$^d$ is hydrogen, C$_1$–C$_{10}$-alkyl, C$_1$–C$_{10}$-alkoxy or C$_6$–C$_{18}$-aryl, where each of the abovementioned groups may be substituted with fluorine and/or chlorine or, together with the carbon atom to which they are bonded, may form a C$_4$–C$_7$-cycloalkyl group, which may be substituted with one or more C$_1$–C$_6$-alkyl groups, Ar and Ar$^1$ are C$_6$–C$_{18}$-aryl, where these may be unsubstituted or substituted with C$_1$–C$_{10}$-alkyl, C$_6$–C$_{18}$-aryl, C$_1$–C$_{10}$-alkoxy or halogen and anhydride end groups of the formula IV

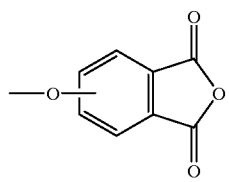

(IV)

The polyarylene ethers B1b have end groups which differ from those of the polyarylene ethers of the formula V where u and w are as defined above for t and q and T', Q' and Z' are as defined above for T, Q and Z and Ar$^2$ and Ar$^3$ are as defined above for Ar and Ar$^1$.

The polyarylene ethers B1a are prepared by reacting polyarylene ethers having recurring units of the formula (III) and hydroxyl end groups with phthalic anhydrides of the formula VI

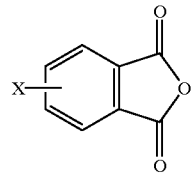

(VI)

where X is fluorine, chlorine, bromine or iodine, in a solvent in the presence of potassium fluoride.

Each of the variables t and q mentioned in the formula III may assume the value 0, 1, 2 or 3. T, Q and Z, independently of one another, may be identical or different. They may be a chemical bond or a group selected from the class consisting of —O—, —SO$_2$—, —S—, C=O, —N=N— and S=O. T, Q and Z may also be a group of the formula —R$^a$C=CR$^b$— or —CR$^c$R$^d$—, where each of R$^a$ and R$^b$ is hydrogen or C$_1$–C$_{10}$-alkyl and each of R$^c$ and R$^d$ is hydrogen, C$_1$–C$_{10}$-alkyl, such as methyl, ethyl, n-propyl, isopropyl, tert-butyl or n-hexyl, or C$_1$–C$_{10}$-alkoxy, such as methoxy, ethoxy, n-propoxy, isopropoxy or n-butoxy, or C$_6$–C$_{18}$-aryl, such as phenyl or naphthyl. R$^c$ and R$^d$ may also, together with the carbon atom to which they are bonded, be linked to give a cycloalkyl ring having from 4 to 7 carbon atoms, preferably cyclopentyl or cyclohexyl. The cycloalkyl rings may be unsubstituted or substituted with one or more, preferably two or three, C$_1$–C$_6$-alkyl groups. An example of a preferred substituent for the cycloalkyl rings is methyl. Preference is given to the use of polyarylene ethers in which T, Q and Z are —O—, —SO$_2$—, C=O, a chemical bond or a group of the formula —CR$^c$R$^d$. Examples of preferred radicals R$^c$ and R$^d$ are hydrogen and methyl. Of the groups T, Q and Z, at least one is —SO$_2$— or C=O. If both the variables t and q are 0, then Z is either —SO$_2$— or C=O, preferably —SO$_2$—. Ar and Ar$^1$ are C$_6$–C$_{18}$-aryl, such as 1,5-naphthylene, 1,6-naphthylene, 2,7-naphthylene, 1,5-anthrylene, 9,10-anthrylene, 2,6-anthrylene, 2,7-anthrylene or biphenylene, or in particular phenylene. These aryl grops are preferably unsubstituted. They may, however, have one or more, for example two, substituents. Possible substituents are C$_1$–C$_{10}$-alkyl, such as methyl, ethyl, n-propyl, isopropyl, tert-butyl or n-hexyl and C$_6$–C$_{18}$-aryl, such as phenyl or naphthyl and C$_1$–C$_{10}$-alkoxy, such as methoxy, ethoxy, n-propoxy, isopropoxy or n-butoxy, and halogen. Preferred substituents include methyl, phenyl, methoxy and chlorine.

Some suitable recurring units are listed below:

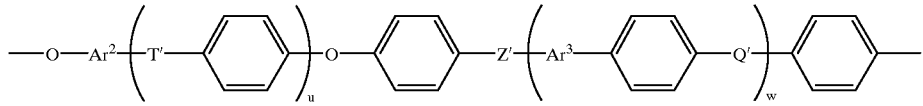

(V)

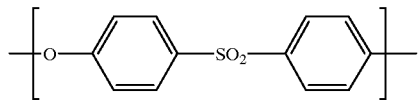
(III₁)
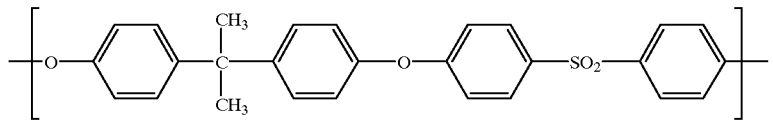
(III₂)
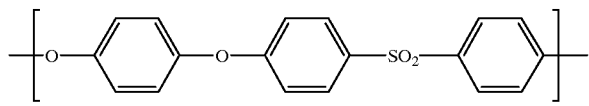
(III₃)
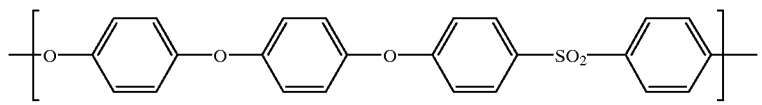
(III₄)
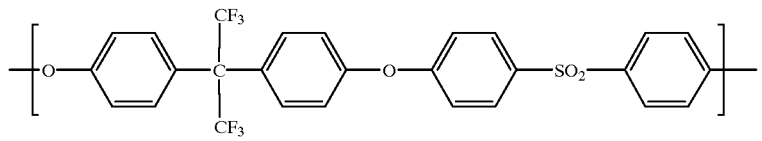
(III₅)
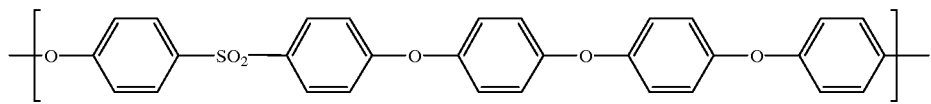
(III₆)
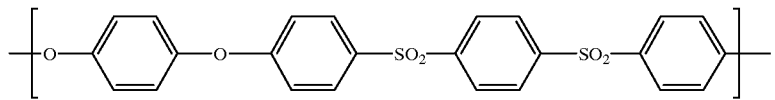
(III₇)
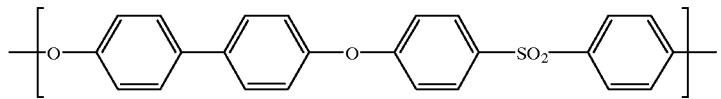
(III₈)
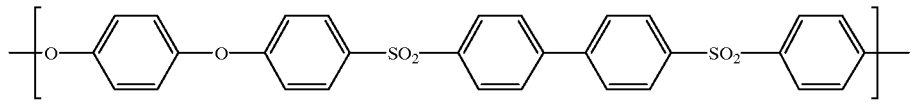
(III₉)
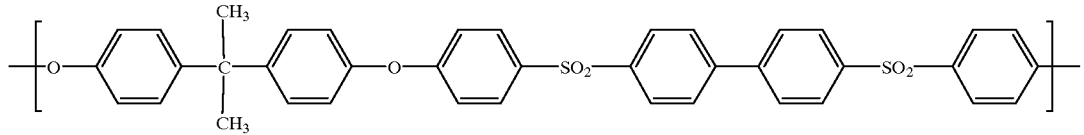
(III₁₀)
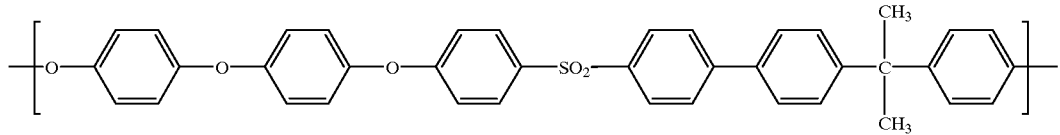
(III₁₁)

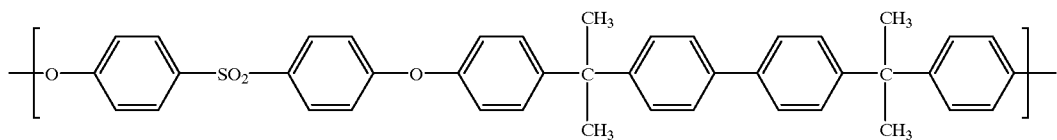
(III₁₂)
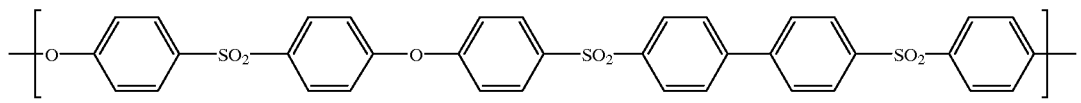
(III₁₃)
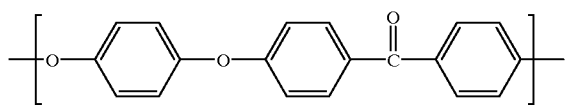
(III₁₄)
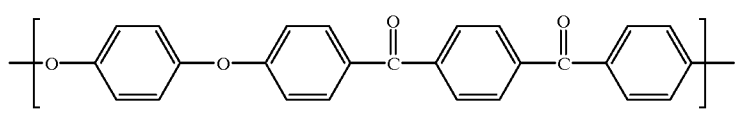
(III₁₅)
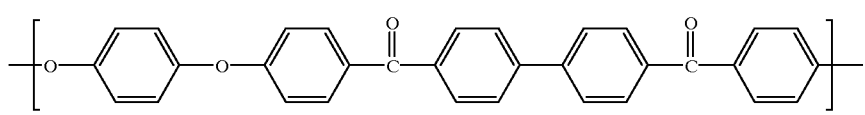
(III₁₆)
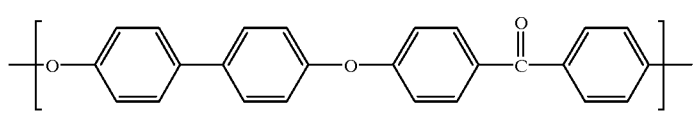
(III₁₇)
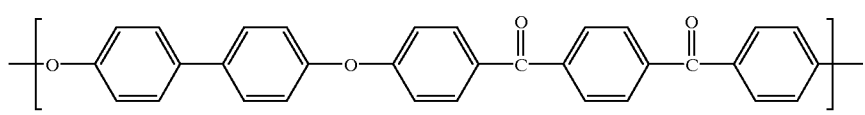
(III₁₈)
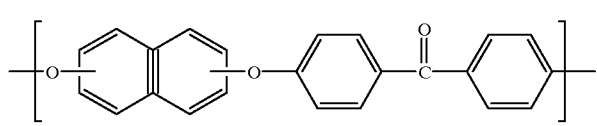
(III₁₉)
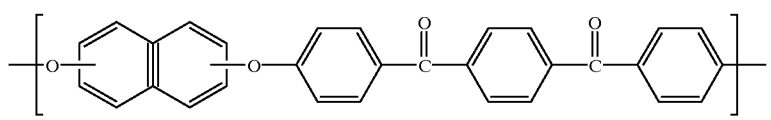
(III₂₀)
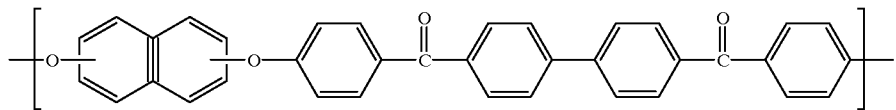
(III₂₁)
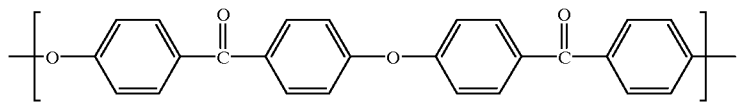
(III₂₂)

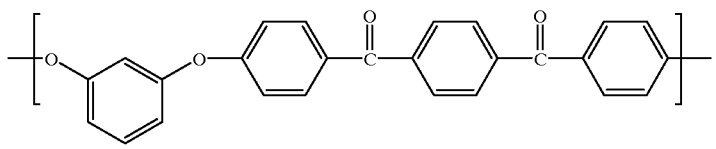 (III₂₃)

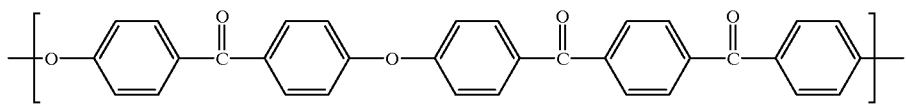 (III₂₄)

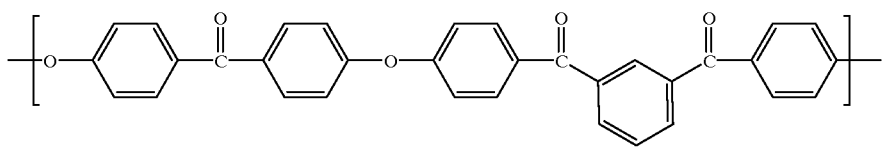 (III₂₅)

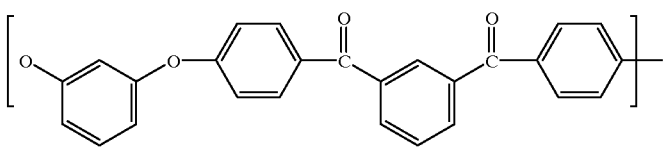 (III₂₆)

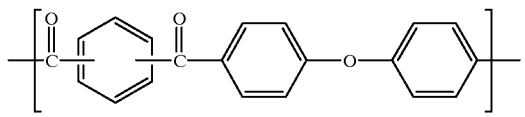 (III₂₇)

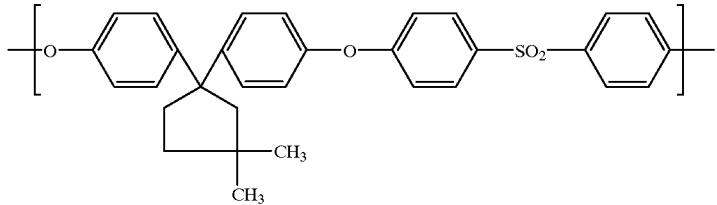 (III₂₈)

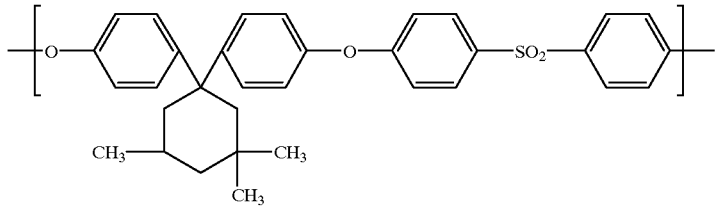 (III₂₉)

Very particular preference is given to polyarylene ethers having recurring units (III$_1$), (III$_2$), (III$_8$) and (III$_{24}$), including, for example, polyarylene ethers B1a and B1b having from 0 to 100 mol % of recurring units (III$_1$) and from 0 to 100 mol % of recurring units (III$_2$).

The polyarylene ethers may also be copolymers or block copolymers in which there are segments of polyarylene ethers and segments of other thermoplastic polymers, such as polyamides, polyesters, aromatic polycarbonates, polyestercarbonates, polysiloxanes, polyimides or polyetherimides. The molecular weights (number-average) of the blocks and/or of the graft branches in the copolymers are generally in the range from 1000 to 30,000 g/mol. The blocks of different structure may be arranged alternately or randomly. The proportion by weight of the polyarylene ethers in the copolymers or block copolymers is generally at least 10% by weight. The proportion by weight of the polyarylene ethers may be up to 97% by weight. Preference is given to copolymers or block copolymers having a proportion by weight of polyarylene ether of up to 90% by weight, and copolymers or block copolymers having from 20 to 80% by weight of polyarylene ether are particularly preferred.

The polyarylene ethers generally have mean molecular weights $M_n$ (number-average) in the range from 5000 to 60,000 g/mol and relative viscosities of from 0.20 to 0.95 dl/g. Depending on the solubility of the polyarylene ethers, the relative viscosities are determined either in 1% strength by weight N-methylpyrrolidone solution, in mixtures of phenol and dichlorobenzene, or in 96% strength sulfuric acid, in each case at 20° C. or 25° C.

Polyarylene ethers having recurring units III are known per se and may be prepared by known methods.

They are produced, for example, by condensing aromatic bishalogen compounds and the alkali metal double salts of aromatic bisphenols. They may also, for example, be prepared by autocondensation of alkali metal salts of aromatic halophenols in the presence of a catalyst. A detailed review of suitable monomers is given, for example, in DE-A-38 43 438. Suitable processes are described, inter alia, in U.S. Pat. Nos. 3,441,538, 4,108, 837 and DE-A-27 38 962. Polyarylene ethers which contain carbonyl functions may also be obtained by electrophilic (Friedel-Crafts) polycondensation, as described, inter alia, in WO 84/03892. In the electrophilic polycondensation, the carbonyl bridges are formed either by reacting dicarboxylic acid chlorides or phosgene with aromatics containing two hydrogen atoms which can be exchanged for electrophilic substituents, or by polycondensation with itself of an aromatic carboxylic acid chloride containing both an acid chloride group and a substitutable hydrogen atom.

Preferred process conditions for synthesizing polyarylene ethers are described, for example, in EP-A-0 113 112 and 0 135 130. The reaction of the monomers in aprotic solvents, in particular N-methylpyrrolidone, in the presence of anhydrous alkali metal carbonate, in particular potassium carbonate, is particularly suitable. The reacting of the monomers in the melt has also proven advantageous in many cases.

Polyarylene ethers having recurring units III and hydroxyl end groups may be prepared, for example, by selecting a suitable molar ratio of dihydroxy monomers and dichloro monomers (see e.g. J. E. McGrath et al., Polym. Eng. Sci. 17, 647 (1977); H.-G. Elias, Makromoleküle, 4th edition, p. 490–493, (1981), Hüthig & Wepf, Basel).

For the preparation of component B1a, preference is given to the use of those having from 0.02 to 2% by weight of hydroxyl end groups, very particular preference being given to those having from 0.1 to 1.5% by weight of hydroxyl end groups.

According to the invention, these polyarylene ethers are reacted with phthalic anhydrides of the formula (VI), preferably chlorophthalic anhydrides and fluorophthalic anhydrides. 3-Fluorophthalic anhydride or 3-chlorophthalic anhydride are particularly preferably used. However, it may also be advantageous to use a mixture of different phthalic anhydrides (VI), for example a mixture of 3-fluorophthalic anhydride and 3-chlorophthalic anhydride. It is possible here to react the different phthalic anhydrides (VI) simultaneously with the polyarylene ethers. It is, however, also possible to react these in sequence, for example firstly 3-fluorophthalic anhydride and then 3-chlorophthalic anhydride.

According to the invention, the reaction of the hydroxyl-terminated polyarylene ethers with the phthalic anhydrides (VI) to give the polyarylene ethers B1a is carried out in a solvent, in particular in a solvent in which the polyarylene ethers, the phthalic anhydrides (VI) and potassium fluoride are sufficiently soluble. Examples of suitable organic solvents are aliphatic or aromatic sulfoxides or sulfones, such as dimethyl sulfoxide, dimethyl sulfone, 1,1-dioxothiolane or diphenyl sulfone, preference being given to dimethyl sulfoxide and diphenyl sulfone. Other suitable solvents are N-cyclohexylpyrrolidone, N,N-dimethylacetamide, dimethylformamide and N-methylpyrrolidone, particular preference being given to N-methylpyrrolidone. Elevated temperatures are generally required for the reactions. The reaction generally proceeds only slowly at below 60° C. Temperatures of 100° C. or above are usually required. The reactions generally take place at from 120 to 250° C. Temperatures above 230° C. are not usually required.

The reaction times required are generally from 0.1 to 5 hours.

According to the invention, the reaction is carried out in the presence of potassium fluoride. The potassium fluoride is generally used in stoichiometric amounts based on phthalic anhydride VI, but the amount of potassium fluoride may also be greater than this, for example up to 10 mol per mol of phthalic anhydride VI. It may also be slightly less. Complete reaction is not usually achieved if the amount of potassium fluoride is less than 1 mol per mol of phthalic anhydride VI. The molar ratio of potassium fluoride to phthalic anhydride is generally from 1 to 7, preferably from 1.1 to 6.

The reaction may also be carried out in the presence of potassium carbonate. From 0.05 to 10 mol of potassium carbonate per mol of potassium fluoride is generally used. The amount of potassium carbonate may, however, also be smaller, for example from 0.05 to 9 mol of potassium carbonate per mol of potassium fluoride. There is generally no further advantage to be gained by adding more than 15 mol of potassium carbonate per mol of potassium fluoride. The reaction is usually carried out in the presence of from 0.05 to 7 mol of potassium carbonate per mol of potassium fluoride. The reaction of the polyarylene ethers with the phthalic anhydrides may be carried out using polyarylene ethers which have been isolated and purified. However, it is also possible to carry out this reaction directly after the preparation of the polyarylene ethers, without isolating or purifying these beforehand. The reaction product is preferably obtained by precipitating in a non-solvent, for example a low-molecular-weight alcohol, such as methanol, ethanol, propanol or isopropanol, or in water or mixtures of these. However, it is also possible to remove the reaction solvent from the reaction product using, for example, a vented extruder or thin-film evaporator, and thus to isolate the reaction product.

The proportion of anhydride end groups in the polyarylene ether B1a may be determined by the known methods of general organic analysis, such as titration, IR spectroscopy, UV spectroscopy and NMR spectroscopy.

Besides the polyarylene ethers B1a, the molding compositions also contain polyarylene ethers B1b whose end groups are different from those of the polyarylene ethers B1a and which contain recurring units of the formula V.

U and w here are as defined for t and q. u and w may, but need not, be identical with t and q, i.e. u and w, independently of t and q, may be identical with or different from these. T', Q' and Z' are as defined for T, Q and Z and may, but need not, be identical with T, Q and Z, i.e. T', Q' and Z' may, independently of T, Q and Z, be identical with or different from T, Q and Z. $Ar^2$ and $Ar^3$ may be identical with or different from Ar and $Ar^1$, i.e. $Ar^2$ and $Ar^3$ may, but need not, be identical with Ar and $Ar^1$, and they are as defined for Ar and $Ar^1$.

It is also possible to use, as component B1b, copolymers containing polyarylene ether segments.

The polyarylene ethers B1b may contain, for example, halogen, methoxy, hydroxyl, phenoxy, benzyloxy or amino end groups. Preference is given to polyarylene ethers B having halogen and/or methoxy end groups.

These polyarylene ethers B are, as stated above, known or obtainable by known methods.

Other polyphenylene ethers B1c suitable as polyarylene ethers are known per se and are preferably prepared by oxidative coupling of phenols disubstituted in the ortho position.

Examples of substituents are halogen, such as chlorine or bromine, and alkyl radicals with from 1 to 5 carbon atoms, preferably without a tertiary hydrogen atom at the α-position, such as methyl, ethyl, propyl or butyl. The alkyl radicals may themselves be substituted by halogen, such as chlorine or bromine, or by a hydroxyl group. Other examples of possible substituents are alkoxy radicals, preferably with up to 4 carbon atoms, and phenyl radicals, which may be unsubstituted or substituted by halogen and/or alkyl. Copolymers of various phenols, such as copolymers of 2,6-dimethylphenol and 2,3,6-trimethylphenol, are likewise suitable. Mixtures of various polyphenylene ethers may, of course, also be employed.

Preference is given to polyphenylene ethers which are compatible with vinylaromatic polymers, ie. are completely or very largely soluble in these polymers (cf. A. Noshay, Block Copolymers, pp. 8–10, Academic Press, 1977 and O. Olabisi, Polymer-Polymer Miscibility, 1979, pp. 117–189).

Examples of polyphenylene ethers are poly(2,6-dilauryl-1,4-phenylene) ether, poly(2,6-diphenyl-1,4-phenylene) ether, poly(2,6-dimethoxy-1,4-phenylene) ether, poly(2,6-diethoxy-1,4- phenylene) ether, poly(2-methoxy-6-ethoxy-1,4-phenylene) ether, poly(2-ethyl-6-stearyloxy-1,4-phenylene) ether, poly(2,6-dichloro-1,4-phenylene) ether, poly(2-methyl-6-phenyl-1,4- phenylene) ether, poly(2,6-dibenzyl-1,4-phenylene) ether, poly(2-ethoxy-1,4-phenylene) ether, poly(2-chloro-1,4-phenylene) ether and poly(2,5-dibromo-1,4-phenylene) ether. Preference is given to polyphenylene ethers in which the substituents are alkyl radicals with from 1 to 4 carbon atoms, such as poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether and poly(2-ethyl-6-propyl-1,4-phenylene) ether. Poly(2,6-dimethyl-1,4-phenylene) ether is particularly preferred.

Graft copolymers of polyphenylene ether and vinylaromatic polymers, such as styrene, α-methylstyrene, vinyltoluene and chlorostyrene, are also suitable.

Preference is given to the use of functionalized or modified polyphenylene ethers, known for example from WO 86/02086, WO 87/00540, EP-A-0 222 246, EP-A-0 223 116 and EP-A-0 254 048.

A polyphenylene ether B11 is usually modified during its preparation by incorporating at least one carbonyl, carboxy, anhydride, amide, imide, carboxylic ester, carboxylate, amino, hydroxyl, epoxy, oxazoline, urethane, urea, lactam or halobenzyl group, so as to improve compatibility with the polyamide.

Component B1c is preferably built up by reacting b11: as component B11, from 70 to 99.95% by weight of at least one unmodified polyphenylene ether, b12: as component B12, from 0 to 29.95% by weight of at least one polymer of vinylaromatic monomers, b13: as component B13, from 0.05 to 30% by weight of at least one monomer capable of reacting with components B11 and B12 and modified by the incorporation of at least one carbonyl, carboxy, anhydride, amide, imide, carboxylic ester, carboxylate, amino, hydroxyl, epoxy, oxazoline, urethane, urea, lactam or halobenzyl group, b14: as component B14, from 0 to 5% by weight of at least one free-radical initiator, where the totals of the amounts of components B11, B13 and, if present, B12 and/or B14, are 100% by weight.

The modification is generally carried out by reacting a polyphenylene ether B11 with a modifier containing at least one of the abovementioned groups, in solution (WO 86/2086), in aqueous dispersion, in a gas-phase process (EP-A-0 025 200) or in the melt, if appropriate in the presence of suitable vinylaromatic polymers or impact modifiers, adding free-radical initiators if desired.

Component B1c in the novel molding compositions is preferably a modified polyphenylene ether obtainable by reaction of b11: as component B11, from 70 to 99.95% by weight, preferably from 75 to 99% by weight of an unmodified polyphenylene ether, b12: as component B12, from 0 to 29.95% by weight, preferably from 4.89 to 20% by weight of a vinylaromatic polymer, b13: as component B13, from 0.05 to 30% by weight, preferably from 0.1 to 5% by weight of at least one compound from the group consisting of B131: α,β-unsaturated dicarbonyl compounds, B132: monomers containing amide groups and a polymerizable double bond and B133: monomers containing lactam groups and a polymerizable double bond, b14: as component B14, from 0 to 5% by weight, preferably from 0.01 to 0.09% by weight, of a free-radical initiator, where the percentages by weight are based on the total of B11 to B14 inclusive in suitable mixing and compounding apparatus, such as twin-screw extruders. The residence time here is preferably in the range from 0.5 to 15 minutes at from 240 to 375° C.

The vinylaromatic polymer B12 is preferably compatible with the polyphenylene ether B11 employed.

The molecular weights of these polymers, which are known per se and are commercially available, are generally in the range from 1500 to 2,000,000, preferably from 70,000 to 1,000,000.

Examples of preferred vinylaromatic polymers B12 compatible with polyphenylene ethers are given in the monograph of Olabisi mentioned above, pages 224–230 and 245. Merely as examples, mention may be made here of vinylaromatic polymers made from styrene, chlorostyrene, α-methylstyrene and p-methylsytrene; the build-up may also involve subordinate proportions (preferably not more than 20% by weight, in particular not more than 8% by weight) of comonomers, such as (meth)acrylonitrile or (meth) acrylates. Particularly preferred vinylaromatic polymers are polystyrene and impact-modified polystyrene. Mixtures of these polymers may, of course, also be used. They are preferably prepared by the process described in EP-A-0 302 485.

Examples of suitable modifiers B13 are maleic acid, methylmaleic acid, itaconic acid, tetrahydrophthalic acid, the anhydrides and imides of these, fumaric acid, the mono- and diesters of these acids, for example those of $C_1$ and $C_2$–$C_8$ alkanols, (monomers B131), the mono- or diamides of these acids, such as N-phenylmaleimide (monomers B132) and maleohydrazide. Other suitable modifiers are the acid chloride of trimelitic anhydride, benzene-1,2-dicarboxylic anhydride-4-carboxylic acid acetic anhydride, chloroethanoylsuccinaldehyde, chloroformylsuccinaldehyde, citric acid and hydroxysuccinic acid. Examples of monomers B133 are N-vinylpyrrolidone and (meth)acryloylcaprolactam.

Examples of free-radical initiators B14 are:
2,4-dichlorobenzoyl peroxide, tert-butyl peroxide, 3,5,5-trimethylhexanoyl peroxide, lauroyl peroxide, decanoyl peroxide, propionyl peroxide, benzoyl peroxide, tert-butyl 2-ethylperoxyhexanoate, tert-butyl peroxydiethylacetate, tert-butyl peroxyisobutyrate, 1,1-di-tert-butylperoxy-3,3,5-trimethylcyclohexane, tert-butylperoxy isopropyl carbonate, tert-butylperoxy-3,3,5-trimethylhexanoate, tert-butyl peracetate, tert-butyl perbenzoate, butyl 4,4-di-tertbutyl peroxyvalerate, 2,2-di-tert-butylperoxybutane, cumyl peroxide, tert-butyl cumyl peroxide, 1,3-di(tertbutylperoxyisopropyl) benzene and tert-butyl peroxide. Mention may also be made of organic hydroperoxides, such as diisopropyl-benzene hydroperoxide, cumene hydroperoxide, tert-butyl hydroperoxide, p-menthyl hydroperoxide and pinane hydroperoxide and highly-branched alkanes of the structure

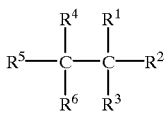

where $R^1$ to $R^6$ are alkyl with from 1 to 8 carbon atoms, alkoxy with from 1 to 8 carbon atoms, aryl, such as phenyl, naphthyl or 5- or 6-membered heterocyclic rings with a p-electron system and nitrogen, oxygen or sulfur as heteroatoms. The substituents $R^1$ to $R^6$ may themselves be substituted by functional groups, such as carboxyl, carboxyl derivatives, hydroxyl, amino, thiol or epoxide. Examples are 2,3-dimethyl-2,3-diphenylbutane, 3,4-dimethyl-3,4-diphenylhexane and 2,2,3,3-tetraphenylbutane.

Component B2

Component B2 is built up from components B21 and B22.

Component B21

Components B2 of the novel molding compositions contain, as component B21, from 60 to 99% by weight, preferably from 70 to 90% by weight and in particular from 75 to 85% by weight of a polyolefin homo- or copolymer or mixtures of these.

Component B21 generally has a melting point >90° C., preferably >125° C. and in particular >160° C.

Examples of suitable polyolefin homopolymers are polyethylene, polypropylene and polybutene, polypropylene being preferred.

Suitable polyethylenes are polyethylenes of very low density (LLDPE), low density (LDPE), medium density (MDPE) and high density (HDPE). These are polyethylenes having short-chain or long-chain branching, or linear polyethylenes, which are prepared by a high-pressure process in the presence of free-radical initiators (LDPE) or by a low-pressure process in the presence of complex initiators, for example Phillips or Ziegler-Natta catalysts (LLDPE, MDPE) or metallocenes. The short-chain branching in LLDPE and MDPE is introduced by copolymerization with α-olefins (for example butene, hexene or octene.

LLDPE generally has a density of from 0.9 to 0.93 g/cm³ and a melting point (determined by differential thermal analysis) of from 120 to 130° C.; LDPE a density of from 0.915 to 0.935 g/cm³ and a melting point of from 105 to 115° C.; MDPE a density of from 0.93 to 0.94 g/cm³ and a melting point of from 120 to 130° C.; HDPE a density of from 0.94 to 0.97 g/cm³ and a melting point of from 128 to 136° C.

Flowability, measured as melt index MVI, is generally from 0.05 to 35 g/10 min, the melt flow index corresponding to the amount of polymer which is extruded within a period of 10 minutes from the DIN 53 735 standard test apparatus at 190° C. and 2.16 kg load.

The novel molding compositions preferably contain polypropylene as component B21.

Suitable polypropylenes are known to the person skilled in the art and are described, for example, in Kunststoffhandbuch Vol. IV, Polyolefine, Carl Hanser Verlag, Munich.

The melt volume index MVI according to DIN 53 735 is generally from 0.3 to 80 g/10 min, preferably from 0.5 to 35 g/10 min, at 230° C. and 2.16 kg load.

Polypropylenes of this type are usually prepared by low-pressure polymerization, using metal-containing catalysts, for example with the aid of titanium- and aluminum-containing Ziegler catalysts, or, in the case of polyethylene, also using Phillips catalysts based on chromium-containing compounds. This polymerization reaction may be carried out using the reactors usual in industry, either in the gas phase, in solution or else in a slurry.

The polyethylene or polypropylene used in preparing the novel polymer mixture may be either in granular or in pellet form. It is also possible to use mixtures, in any desired ratio, of the polyethylene with polypropylene.

Other suitable components B21 are copolymers of ethylene with α-olefins, such as propylene, butene, hexene, pentene, heptene and octene, or with non-conjugated dienes, such as norbornadiene and dicyclopentadiene. For the purposes of the invention, copolymers B21 are either random or block copolymers.

Random copolymers are usually obtained by polymerizing a mixture of different monomers, and block copolymers by polymerizing different monomers in sequence.

Component B22

Components B2 of the novel molding compositions contain, as component B22, from 1 to 40% by weight, preferably from 10 to 30% by weight and in particular from 15 to 25% by weight of a compatibilizer which has adequate affinity both for component A and also for component B21. The surface tension between A and B21 is accordingly reduced, giving better phase dispersion and phase compatibility.

Polymers which are suitable as compatibilizers B22 are the polyolefin homo- and copolymers described under B21 which contain from 0.1 to 20% by weight, preferably from 0.2 to 10% by weight and in particular from 0.2 to 5% by weight (based on 100% by weight of component B22) of functional monomers.

For the purposes of the invention, functional monomers are monomers which contain carboxy groups, anhydride groups, amide groups, imide groups, carboxylic ester groups, amino groups, hydroxyl groups, epoxide groups, oxazoline groups, urethane groups, urea groups or lactam groups and which have a reactive double bond.

Examples of these are methacrylic acid, maleic acid, maleic anhydride, fumaric acid, itaconic acid and the alkyl esters of the abovementioned acids and their amides, maleimide, allylamine, allyl alcohol, glycidyl methacrylate, vinyl- and isopropenyloxazoline and methacryloylcaprolactam.

The functional monomers may be introduced into the polymer chain either by copolymerization or by grafting. The grafting may be carried out either in solution or in the melt, and free-radical initiators, such as peroxides, hydroperoxides, peresters and percarbonates, may, if desired, be included in the reaction.

Compatibilizers of this type are generally commercially available (Polybond® from BP Chemical, Exxelor® from Exxon, Hostamont® from Hoechst, Admer® from Mitsui, Orevac® from Atochem, Epolene® from Eastman, Hostaprime® from Hoechst, Kraton® from Shell and Fasaband® from DuPont).

Component B3

Component B3 is built up from components B31 and B32.

Component B31

Components B3 of the novel molding compositions comprise, as component B31, from 70 to 100% by weight, preferably from 75 to 100% by weight and in particular from 80 to 100% by weight of an ASA (acrylic-styrene-acrylate) or ABS (acrylonitrile-butadiene-styrene) or SAN (styrene-acrylonitrile) polymer or of a polymer made from $C_1$–$C_{18}$-alkyl (meth)acrylates, or mixtures of such polymers.

The mixing ratio of the polymers can be varied within wide limits; in the case of the mixture of (meth)acrylates with ASA, ABS or SAN, however, it should be noted that these are miscible only up to an acrylonitrile content of 27% by weight (up to 250° C., based on the processing temperature) and 25% by weight (up to 300° C.), based on the total content of, for example, ABS.

Preferred ASA polymers are built up from a soft or rubber phase of a graft polymer made from:

B311 from 50 to 90% by weight of a graft base based on
B3111 from 95 to 99.9% by weight of a $C_2$–$C_{10}$-alkyl acrylate and
B3112 from 0.1 to 5% by weight of a bifunctional monomer having two olefinic, non-conjugated double bonds, and
B312 from 10 to 50% by weight of a graft made from
B3121 from 20 to 90% by weight of styrene or substituted styrenes of the formula (I) below or mixtures of these and
B3122 from 10 to 80% by weight of acrylonitrile, methacrylonitrile, acrylates or methacrylates or mixtures of these, in a mixture with a hard matrix based on an SAN copolymer B313 made from:

B3131 from 50 to 90% by weight, preferably from 55 to 90% by weight and in particular from 65 to 85% by weight of styrene and/or substituted styrenes of the formula (I) below and
B3132 from 10 to 50% by weight, preferably from 10 to 45% by weight and in particular from 15 to 35% by weight, of acrylonitrile and/or methacrylonitrile.

Component B311

Component B311 is an elastomer which has a glass transition temperature of below −20° C., in particular below −30° C.

The elastomer is prepared using, as main monomers B3111, acrylates having from 2 to 10 carbon atoms, in particular from 4 to 8 carbon atoms. Examples of particularly preferable monomers are tert-butyl, isobutyl and n-butyl acrylate and 2-ethylhexyl acrylate, of which the two last named are particularly preferred.

Besides these acrylates, use is made of from 0.1 to 5% by weight, in particular from 1 to 4% by weight, based on the total weight of B3111 and B3112, of a polyfunctional monomer having at least two olefinic, non-conjugated double bonds. Of these, preference is given to the use of bifunctional compounds, i.e. those having two non-conjugated double bonds, for example divinylbenzene, diallyl fumarate, diallyl phthalate, triallyl cyanurate, triallyl isocyanurate, tricyclodecenyl acrylate and dihydrodicyclopentadienyl acrylate, the last two of which are particularly preferred.

Processes for preparing the graft base B311 are known per se and are described, for example, in DE-B-1 260 135. Corresponding products are also commercially available.

Preparation by emulsion polymerization has proven particularly advantageous in a number of cases.

The precise polymerization conditions, in particular the type, method of addition and amount of the emulsifier, are preferably selected so that the latex of the acrylate, which is crosslinked at least to some extent, has an average particle size (weight average $d_{50}$) in the range from about 200 to 700 nm, in particular from 250 to 600 nm. The latex preferably has a narrow particle size distribution, i.e. the quotient $$Q = \frac{d_{90} - d_{10}}{d_{50}}$$

is preferably smaller than 0.5, in particular smaller than 0.35.

The proportion of the graft base B311 in the graft polymer made from B311 and B312 is from 50 to 90% by weight, preferably from 55 to 85% by weight, and in particular from 60 to 80% by weight, based on the total weight of B311 and B312.

Component B312

A graft shell B312 is grafted onto the graft base B311 and is obtainable by copolymerizing B3121 from 20 to 90% by weight, preferably from 30 to 90% by weight and in particular from 30 to 80% by weight of styrene or substituted styrenes of the formula (I)

where R are alkyl radicals having from 1 to 8 carbon atoms, hydrogen or halogen and R' are alkyl radicals having from 1 to 8 carbon atoms or halogen and n is 0, 1, 2 or 3, and B3122 from 10 to 80% by weight, preferably from 10 to 70% by weight and in particular from 20 to 70% by weight of acrylonitrile, methacrylonitrile, acrylates or methacrylates or mixtures of these.

Examples of substituted styrenes are α-methylstyrene, p-methylstyrene, p-chlorostyrene and p-chloro-α-methylstyrene, styrene and α-methylstyrene being preferred.

Preferred acrylates or methacrylates are those whose homopolymers or copolymers with the other monomers of component B3122 have glass transition temperatures above 20° C.; in principle, however, it is also possible to use other acrylates, preferably in amounts which give a glass transition temperature $T_g$ of above 20° C. for the entire component B312.

Particular preference is given to acrylates or methacrylates of $C_1$–$C_8$-alcohols and to epoxy-containing esters, such as glycidyl acrylate and glycidyl methacrylate. Very particularly preferred examples are methyl methacrylate, tert-butylmethacrylate, glycidyl methacrylate and n-butyl acrylate, where the last named is preferably not used in excessively high proportion, because of its property of forming polymers having very low $T_g$.

The graft shell B312 can be prepared in one or in more than one, for example in two or three, steps, the overall formulation remaining unaffected thereby.

The graft shell is preferably prepared in emulsion, as described, for example, in DE–C-12 60 135, DE-A-32 27 555 DE-A-31 49 357 and DE-A-34 14 118.

Depending on the conditions selected, a certain proportion of free copolymers of styrene and/or of substituted styrene derivatives and of (meth)acrylonitrile and/or (meth)acrylates is produced during the graft copolymerization.

The graft copolymer comprising B311 and B312 generally has an average particle size of from 100 to 1000 nm, in particular from 200 to 700 nm ($d_{50}$ weight average). The conditions for preparing the elastomers B311 and for the grafting are therefore selected so that particle sizes in this range are obtained. Measures for this are known and are described, for example, in DE-C-1 260 135 and DE-A-28 26 925, and in Journal of Applied Polymer Science, Vol. 9 (1965), pp. 2929–2938. The increase in particle size of the elastomer latex can, for example, be brought about by agglomeration.

For the purposes of this invention, the free, non-grafted homo- and copolymers produced during the graft copolymerization to prepare component B312 are also counted as part of the graft polymer comprising B311 and B312.

Some preferred graft polymers are cited below:
1. 60% by weight of graft base B311 made from
    B3111 98% by weight of n-butyl acrylate and
    B3112 2% by weight of dihydrodicyclopentadienyl acrylate and 40% by weight of graft shell B312 made from
      B3121 75% by weight of styrene and
      B3122 25% by weight of acrylonitrile
2: Graft base as in 1 with 5% by weight of a first graft made from styrene and 35% by weight of a second graft made from
    B3121 75% by weight of styrene and
    B3122 25% by weight of acrylonitrile
3: Graft base as in 1 with 13% by weight of a first graft made from styrene and 27% by weight of a second graft made from styrene and acrylonitrile in a weight ratio of 3:1.

The materials obtained as component B313 may, for example, be prepared by the processes described in DE-B-10 01 001 and DE-B-10 03 436. Copolymers of this type are also obtainable commercially. The weight-average molecular weight determined by light scattering is preferably in the range from 50,000 to 500,000, in particular from 100,000 to 250,000.

The weight ratio of (B311 and B312): B313 is in the range from 1:2.5 to 2.5:1, preferably from 1:2 to 2:1 and in particular from 1:1.5 to 1.5:1.

SAN polymers suitable as component B31 are described above (see B131 and B132).

The viscosity number of the SAN polymers, measured according to DIN 53 727 in 0.5% strength by weight solution in dimethylformamide at 23° C. is generally in the range from 40 to 100 ml/g, preferably from 50 to 80 ml/g.

ABS polymers as polymers B31 in the novel molding compositions have the same structure as described above for ASA polymers. Instead of the acrylate rubber B311 of the graft base in the ASA polymer, use is usually made of conjugated dienes, giving preferably the following formulation for the graft base B314:
    B3141 from 70 to 100% by weight of a conjugated diene and
    B3142 from 0 to 30% by weight of a bifunctional monomer having two olefinic, non-conjugated double bonds.

Examples of conjugated dienes are 1,3-pentadiene, alkyl-substituted dienes, such as 2,3-dimethylbutadiene, or conjugated hexadienes, heptadienes and octadienes and cyclic dienes, such as cyclopentadiene, butadiene and isoprene being preferred.

Graft B312 and the hard matrix of the SAN copolymer B313 remain unchanged in the formulation. Products of this type are commercially available. The preparation processes are known to the person skilled in the art, and further details on this point are therefore unnecessary.

The weight ratio of (B314 and B312) : B313 is in the range from 3:1 to 1:3, preferably from 2:1 to 1:2.

Another possible polymer B31 in the novel molding compositions is a polymer of a $C_1$–$C_{18}$-alkyl (meth)acrylate or mixtures of these.

$C_1$–$C_{18}$-Alkyl acrylates used according to the invention are $C_1$–$C_{18}$-alkyl esters such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl acrylate, preferably methyl acrylate, n-butyl acrylate or 2-ethylhexyl acrylate, or mixtures of these monomers.

$C_1$–$C_{18}$-Alkyl methacrylates used according to the invention are $C_1$–$C_{18}$-alkyl esters such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl methacrylate, preferably methyl methacrylate, or mixtures of these monomers.

Other comonomers which may be used are up to 50% by weight, preferably from 1 to 20% by weight, of the following monomers, for example:
    vinylaromatics such as styrene, α-methylstyrene, vinyltoluene or p-tert-butylstyrene;
    p-aminostyrene;
    p-hydroxystyrene;
    p-vinylbenzoic acid;
    acrylic and methacrylic acid;
    acrylamide and methacrylamide;
    maleic acid and its imides and $C_1$–$C_{10}$-alkyl esters;
    fumaric acid and its imides and $C_1$–$C_{10}$-alkyl esters;
    itaconic acid and its imides and $C_1$–$C_{10}$-alkyl esters;
    acrylonitrile and methacrylonitrile;
    hydroxyalkyl (meth)acrylates.

Polymers which have proven particularly advantageous are those made from 99% by weight of methyl methacrylate and 1% by weight of methyl acrylate having a molecular weight (weight-average $M_w$) of from 60,000 to 300,000 g/mol, in particular from 80,000 to 150,000 g/mol.

Polymethyl methacrylate is generally prepared by known polymerization processes, such as bulk, solution, emulsion or bead polymerization. Such processes are described, for example, in Kunststoffhandbuch, Vol. 9, Vieweg and Esser; Polymethylmethacrylat, Carl-Hanser-Verlag, Munich, 1975, pp. 36 ff.

Component B32

The phase compatibility of the two polymers A and B31 is further improved by the compatibilizer, which is modified with functional monomers.

An unmodified ABS, SAN or ASA polymer or (meth)acrylate polymer (see component B31) is usually modified by incorporating at least one carbonyl, carboxy, anhydride, amide, imide, carboxylic ester, carboxylate, amino, hydroxyl, epoxy, oxazoline, urethane, urea, lactam, halobenzyl or 1,2,4-triazoline-3,5-dione group (functional monomers).

Examples of suitable modifiers are maleic acid, methyl maleate, itaconic acid, tetrahydrophthalic acid, anhydrides and imides of these, fumaric acid, the mono- and diesters of these acids, for example with $C_1$- and $C_2$–$C_8$ alkanols, the mono- or diamides of these acids, such as N-phenylmaleimide and maleohydrazide. Other examples are N-vinylpyrrolidone and (meth)acryloylcaprolactam. Another group of modifiers includes, for example, the acid chloride of trimellitic anhydride, benzene-1,2-dicarboxylic anhydride-4-carboxylic acid-acetic acid anhydride, chloroethanoylsuccinaldehyde, chloroformylsuccinaldehyde, citric acid and hydroxysuccinic acid.

A particularly preferred modifier is 1,2,4-triazoline-3,5-dione itself or 4-substituted 1,2,4-triazoline-3,5-diones of the formula (II)

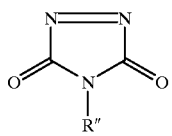

(II)

where R″ is alkyl, cycloalkyl, aryl, aralkyl or alkylaryl having up to 25 carbon atoms or a heterocycle having from 5 to 8 members and having nitrogen, oxygen or sulfur as hetero atom, for $NR^7R^8$, where $R^7$ and $R^8$ are $C_1$–$C_4$-alkyl or in particular hydrogen.

The functional monomers may be introduced into the polymer chain either by copolymerization or by grafting. The grafting may be carried out either in solution or in the melt, and, if desired, free-radical initiators, such as peroxides, hydroperoxides, peresters and percarbonates, may be included in the reaction.

Component C

The novel molding compositions may contain from 0 to 20% by weight, preferably from 0 to 10% by weight and in particular from 0 to 5% by weight of an elastomeric polymer. Polymers of this type are often termed impact-modifying polymers, impact modifiers, elastomers or rubbers.

Component C generally has at least one elastomeric phase, whose softening point is below −25° C., preferably below −30° C.

Component C1

Impact-modifying polymers which increase the toughness of component A are copolymers of ethylene with propylene and, if desired, with a conjugated diene (EP (ethylene-propylene) copolymer rubbers and EPDM (ethylenepropylene-diene) terpolymer rubbers, respectively), where the ethylene content is preferably 45% by weight and in particular 50% by weight (based on 100% by weight of component C1).

Impact modifiers of this type are well known, and for further details, therefore, reference may be made to the publication of Cartasegna in Kautschuk, Gummi, Kunststoffe, 39, (1986), 1186–91.

Rubbers which increase the toughness of polyamides generally have two important features: they contain an elastomeric fraction, which has a glass transition temperature of below −10° C., preferably below −30° C. and at least one functional group which can react with the polyamide. Examples of suitable functional groups are carboxylic acid, carboxylic anhydride, carboxylic ester, carboxamide, carboximide, amino, hydroxyl, epoxide, urethane and oxazoline groups.

Examples of rubbers which increase the toughness of polyamides are:

EP and EPDM rubbers which have been grafted with the above functional groups. Examples of suitable grafting reagents are maleic anhydride, itaconic acid, acrylic acid, glycidyl acrylate and glycidyl methacrylate. These monomers may be grafted onto the polymer in the melt or in solution, if desired in the presence of a free-radical initiator, such as cumene hydroperoxide.

Copolymers of α-olefins may also be mentioned. The α-olefins are usually monomers having from 2 to 8 carbon atoms, preferably ethylene and propylene. Comonomers which have proven suitable are alkyl acrylates or alkyl methacrylates derived from alcohols having from 1 to 8 carbon atoms, preferably from ethanol, butanol or ethylhexanol, and reactive comonomers, such as acrylic acid, methacrylic acid, maleic acid, maleic anhydride or glycidyl (meth)acrylate and also vinyl esters, in particular vinyl acetate. Mixtures of different comonomers may likewise be used. Copolymers which have proven particularly suitable are those of ethylene with ethyl or butyl acrylate and acrylic acid and/or maleic anhydride.

The copolymers may be prepared in a high-pressure process at a pressure of from 400 to 4500 bar or by grafting the comonomers onto the poly-α-olefin. The proportion of the α-olefin in the copolymer is generally in the range from 99.95 to 55% by weight.

A further group of suitable elastomers which may be mentioned is that of core-shell graft rubbers. These are graft rubbers prepared in emulsion and consisting of at least one hard and one soft constituent. A hard constituent is usually a polymer having a glass transition temperature of at least 25° C., and a soft constituent is usually a polymer having a glass transition temperature of not more than 0° C. These products have a structure made from a core and at least one shell, the structure resulting from the sequence of monomer addition. The soft constituents are derived, inter alia, from butadiene, isoprene, alkyl acrylates or alkyl methacrylates and, if desired, other comonomers. Examples of suitable comonomers here are styrene, acrylonitrile and crosslinking or grafting monomers having more than one polymerizable double bond, such as diallyl phthalate, divinylbenzene, butanediol diacrylate and triallyl (iso)cyanurate. The hard constituents are derived, inter alia, from styrene, α-methylstyrene and their copolymers, preferably comonomers here being acrylonitrile, methacrylonitrile and methyl methacrylate.

Preferred core-shell graft rubbers comprise a soft core and a hard shell or a hard core, a first soft shell and at least one further hard shell. The incorporation of functional groups here, such as carbonyl, carboxy, anhydride, amide, imide, carboxylic ester, amino, hydroxyl, epoxy, oxazoline, urethane, urea, lactam or halobenzyl groups is preferably achieved by adding suitable functionalized monomers in the polymerization of the last shells. Examples of suitable functionalized monomers are maleic acid, maleic anhydride, mono- or diesters of maleic acid, tert-butyl (meth)acrylate, acrylic acid, glycidyl (meth)acrylate and vinyloxazoline. The proportion of monomers having functional groups is generally from 0.1 to 25% by weight, preferably from 0.25 to 15% by weight, based on the total weight of the core-shell graft rubber. The weight ratio of soft to hard constituents is generally from 1:9 to 9:1, preferably from 3:7 to 8:2.

Rubbers of this type, which increase the toughness of polyamides, are known per se and are described, for example, in EP-A-0 208 187.

Thermoplastic polyester elastomers are another group of suitable impact-modifiers. For the purposes of the invention, these are segmented copolyether esters which contain long-chain segments derived generally from polyalkylene ether glycols and short-chain segments derived from low-molecular-weight diols and dicarboxylic acids. Products of this type are known per se and are described in the literature, for example in U.S. Pat. No. 3,651,015. Corresponding products are commercially available under the designations Hytrel® (Du Pont), Arnitel® (Akzo) and Pelprene®.

It is, of course, also possible to use mixtures of different rubbers.

Component C2

If the novel molding compositions have, as component B, at least one, if desired modified, polyphenylene ether as component B1, the impact modifier may be present in the polyamide phase A or in the polyphenylene ether phase B1. The impact modifier used for the polyphenylene ether of component B1 here is generally different from that for the copolyamide of component A. The total amount of the impact modifiers of components C1 and C2 used here is from 0 to 20% by weight, preferably from 0 to 10% by weight, in particular from 0 to 5% by weight. If the impact modifiers are present, the amount may preferably be from 1 to 20% by weight, particularly preferably from 2 to 10% by weight, in particular from 3 to 5% by weight.

Examples of rubbers of component C2, which increase the toughness of polyphenylene ethers are given below:

polyoctenylenes, graft rubbers having a crosslinked, elastomeric core, derived, for example, from butadiene, isoprene or alkyl acrylates, and a graft shell of polystyrene, and also copolymers of ethylene and acrylates and/or methacrylates, and ethylene-propylene (EP) and ethylene-propylenediene (EPDM) rubbers, and moreover EP and EPDM rubbers grafted with styrene.

It is moreover possible to use block copolymers having up to six, preferably having up to four, equal or different blocks, which may be bonded linearly or in the shape of a star (radial block copolymers).

It is likewise possible to use mixtures of block copolymers of different structures, for example mixtures of two- and three-block copolymers or of hydrogenated and unhydrogenated block copolymers.

Impact-modifying polymers of this type are known per se and are described in the literature. Merely as examples, reference may be made to U.S. Pat. No. 4,085,163, U.S. Pat. No. 4,041,103, U.S. Pat. No. 3,149,182, U.S. Pat. No. 3,231,635 and U.S. Pat. No. 3,462,162.

Corresponding products are also obtainable commercially, for example a polyoctylene under the designation Vestenamer® (Hüls AG), and a wide variety of suitable block copolymers having at least one vinylaromatic and one elastomeric block. Examples are Cariflex® TR grades (Shell), Kraton® G grades (Shell), Finaprene® grades (Fina) and Europene® SOL TR grades (Enichem).

Component D

Component D is present in the novel molding compositions in an amount of from 0 to 50% by weight, preferably from 10 to 40% by weight, in particular from 20 to 30% by weight.

At least one filler is used as component D.

Preferred fibrous reinforcing materials are carbon fibers, potassium titanate whiskers, aramid fibers and, particularly preferred, glass fibers. If glass fibers are used, these may be provided with a size and a compatibilizer, for better compatibility with the copolyamide A. The glass fibers used generally have a diameter in the range from 6 to 20 $\mu$m.

These glass fibers may be incorporated either in the form of short glass fibers or in the form of continuous strands (rovings). In the finished injection molding, the average length of the glass fibers is preferably in the range from 0.08 to 0.5 mm.

Suitable particulate fillers are amorphic silicic acid, magnesium carbonate, chalk, kaolin (in particular calcined kaolin), powdered quartz, mica, talc, feldspar and in particular calcium silicates, such as wollastonite. Nanocomposites may be used.

Examples of preferred fillers are 20% by weight of glass fibers with 15% by weight of wollastonite and 15% by weight of glass fibers with 15% by weight of wollastonite.

Besides these, it is possible to incorporate metal flakes (eg. aluminum flakes from Transmet Corp.), metal powders, metal fibers, metal-coated fillers, eg. nickel-coated glass fibers and other additives which screen electromagnetic waves. Aluminum flakes (K 102 from Transmet Corp.) are particularly suitable for EMI (electromagnetic interference) purposes. The compositions may also be mixed with additional carbon fibers, carbon black, especially conductivity black or nickel-coated carbon fibers.

Other preferred fillers are delaminated phyllosilicates. The novel molding compositions may contain from 5 to 15% by weight, preferably from 1 to 10% by weight and in particular from 2 to 9% by weight of a delaminated phyllosilicate, in particular in component A. Phyllosilicates of this type are described, for example, in Giannelis, Adv. Mat. 1996, 8-1, 29. The term phyllosilicate is taken in general to mean silicates in which the $SiO_4$ tetrahedrons are linked in continuous two-dimensional structures. (The empirical formula for the anion is $(Si_2O_5{}^{2-})_n$). The individual layers are linked to one another by the cations which lie between them, the cations most frequently present in the naturally occurring phyllosilicates being Na, K, Mg, Al or/and Ca.

The layer thicknesses of such silicates before delamination are usually from 5 to 100 Å, preferably from 5 to 50 Å, and in particular from 8 to 20 Å.

Examples of synthetic and natural phyllosilicates are montmorillonite, smectite, illite, sepiolite, palygorskite, muscovite, allevardite, amesite, hectorite, fluorohectorite, saponite, beidellite, talc, nontronite, stevensite, bentonite, mica, vermiculite, fluorovermiculite, halloysite and fluorine-containing synthetic varieties of mica.

For the purposes of the invention, delaminated phyllosilicates are phyllosilicates in which the distances between the layers have firstly been increased by reaction with hydrophobicizers and then, if desired, addition of monomers or oligomers of the copolyamides according to the invention (also termed swelling).

The delamination of the layers, giving preferably a distance between the layers in the molding of at least 40 Å, particularly preferably at least 50 Å, is brought about by subsequent polycondensation or mixing, e.g. by compounding the hydrophobicized and, if desired, swollen phyllosilicate with the copolyamides according to the invention of component A.

To increase the distances between the layers (hydrophobicization), the phyllosilicates are reacted (before the preparation of the novel molding compositions) with hydrophobicizers, often also termed onium ions or onium salts.

The cations of the phyllosilicates are replaced by organic hydrophobicizers; the desired distances between the layers are dependent on the type of the particular monomer or polymer into which the phyllosilicate is to be incorporated and can be adjusted by varying the type of organic radical used.

Either some or all of the metal ions may be exchanged. Exchange of all of the metal ions is preferred. The amount of exchangeable metal ions is usually given in milliequivalents (meq) per 100 g of phyllosilicate and termed ion-exchange capacity.

Phyllosilicates having a cation-exchange capacity of at least 50 meq/100 g, preferably from 80 to 130 meq/100 g, are preferred.

Suitable organic hydrophobicizers are derived from oxonium, ammonium, phosphonium and sulfonium ions, which may carry one or more organic radicals.

Examples of suitable hydrophobicizers are those having the formula VII and/or VIII:

$$[XR^7R^8R^9R^{10}]^{n+}Z^{n-} \quad (VII)$$

$$[YR^7R^8R^9]^{n+}Z^{n-} \quad (VIII)$$

where:

$R^7$, $R^8$, $R^9$, $R^{10}$, independently of one another, are hydrogen, a straight-chain or branched, saturated or unsaturated hydrocarbon radical having from 1 to 40, preferably from 1 to 20, carbon atoms, which may be unsubstituted or may carry at least one functional group, or where 2 of the radicals are bonded to one another, in particular to give a heterocyclic radical having from 5 to 10 carbon atoms, X is phosphorus or nitrogen, Y is oxygen or sulfur, n is an integer from 1 to 5, preferably from 1 to 3 and Z is an anion.

Suitable functional groups are hydroxyl, nitro or sulfo, and carboxyl groups are particularly preferred, since functional groups of this type give better linking to the end groups of the polyamide.

Suitable anions Z are derived from protonic acids, in particular mineral acids, preference being given to ions derived from halogens, such as chlorine, bromine, fluorine and iodine, and to sulfate, sulfonate, phosphate, phosphonate, phosphite and carboxylate, in particular acetate.

The phyllosilicates used as starting materials are generally reacted in the form of a suspension. The preferred suspension medium is water, if desired in a mixture with alcohols, in particular low-molecular-weight alcohols having from 1 to 3 carbon atoms. It can be advantageous to use a hydrocarbon, for example heptane, together with the aqueous medium, since the hydrophobicized phyllosilicates are generally more compatible with hydrocarbons than with water.

Examples of other suitable suspension media are ketones and hydrocarbons. Preference is generally given to a solvent which is miscible with water. When the hydrophobicizer is added to the phyllosilicate, ion exchange takes place, as a result of which the phyllosilicate usually becomes more hydrophobic and precipitates from the solution. The metal salt produced as by-product of the ion exchange is preferably soluble in water, so that the hydrophobicized phyllosilicate can be isolated, for example by filtration, as a crystalline solid.

The ion exchange is to a large extent independent of the reaction temperature. The temperature is preferably above the crystallization point of the medium and below its boiling point. In aqueous systems, the temperature is from 0 to 100° C., preferably from 40 to 80° C.

For the copolyamides of component A and molding compositions according to the invention, preference is given to alkylammonium ions, particularly those obtainable by reacting suitable ω-aminocarboxylic acids, such as ω-aminododecanoic acid, ω-aminoundecanoic acid, ω-aminobutyric acid, ω-aminocaprylic acid or ω-aminocaproic acid with the usual mineral acids, for example hydrochloric acid, sulfuric acid or phosphoric acid or with methylating agents, such as methyl iodide.

Other preferred alkylammonium ions are laurylammonium, myristylammonium, palmitylammonium, stearylammonium, pyridinium, octadecylammonium, monomethyloctadecylammonium and dimethyloctadecylammonium ions.

Examples of suitable phosphonium ions are docosyltrimethylphosphonium, hexatriacontyltricyclohexylphosphonium, octadecyltriethylphosphonium, dieicosyltriisobutylphosphonium, methyltrinonylphosphonium, ethyltrihexadecylphosphonium, dimethyldidecylphosphonium, diethyldioctadecylphosphonium, octadecyldiethylallylphosphonium, trioctylvinylbenzylphosphonium, dioctadecylethylhydroxyethylphosphonium, docosyldiethyldichlorobenzylphosphonium, octylnonyldecylpropargylphosphonium, triisobutylperfluorodecylphosphonium, eicosyltrihydroxymethylphosphonium, triacontyltriscyanethylphosphonium and bistrioctylethylenediphosphonium.

Other suitable hydrophobicizers are described, inter alia, in WO 93/4118, WO 93/4117, EP-A-0 398 551 and DE-A-36 32 865.

After hydrophobicization, the phyllosilicates have a distance between the layers of from 10 to 40 Å, preferably from 13 to 20 Å. The distance between the layers is usually the distance from the lower boundary of the upper layer to the upper boundary of the lower layer. The length of the lamellae is usually up to 2000 Å, preferably up to 1500 Å.

The phyllosilicate hydrophobicized in the abovementioned manner can then be mixed, in suspension or as a solid, with the copolyamide monomers or copolyamide prepolymers of component A, and the polycondensation can be carried out in the usual manner.

It is possible here to increase further the distance between the layers by reacting (frequently termed swelling) the phyllosilicate with monomers and/or prepolymers of the copolyamides according to the invention at from 25 to 300° C., preferably from 100 to 280° C. and in particular from 200 to 260° C., during a residence time of from 5 to 120 min, preferably from 10 to 60 min. Depending on the residence time and the type of monomer selected, the distance between the layers increases further by from 10 to 140 Å, preferably from 20 to 50 Å. The polycondensation of the post-condensation is then carried out in the usual manner. It is particularly advantageous to carry out the polycondensation with simultaneous application of shear, the shear stresses according to DIN 11 443 being preferably from 10 to $10^5$ Pa, in particular from $10^2$ to $10^4$ Pa.

The delaminated phyllosilicates here can be added to the monomers or to the prepolymer melt (vented extruder).

Component E

Component E is present in the novel molding compositions in an amount of from 0 to 20% by weight, preferably from 0 to 10% by weight, in particular in the case of stabilizers from 0 to 1% by weight.

Component E comprises the customary additives and processing aids for polyamide blends. Examples of such additives are: dyes, pigments, colorants, antistats, antioxidants, stabilizers for improving thermal stability, for increasing stability to the effects of light and for raising the resistance to hydrolysis and to chemicals, agents counteracting thermal decomposition and in particular the lubricants which are useful for producing moldings. These other additives can be metered in at any stage of the preparation process, but preferably at an early time, so that early use is made of their stabilizing (or other specific) effects.

Flame retardants, for example, may be added, in particular in polyphenylene ether blends.

Examples of suitable flame retardants are polyhalodiphenyl, polyhalodiphenyl ethers, polyhalophthlaic acid and its derivatives, polyhalooligo- and -polycarbonates, the bromo compounds of these types being particularly effective.

Examples of these are polymers of 2,6,2',6'-tetrabromobisphenol A, of tetrabromophthalic acid, of 2,6-dibromophenol and of 2,4,6-tribromophenol and their derivatives.

A preferred flame retardant is elemental phosphorus. The elemental phosphorus may generally be phlegmatized or coated with, for example, polyurethanes or aminoplastics. Concentrates of red phosphorus, for example in a polyamide, elastomer or polyolefin, are also suitable.

Particularly suitable combinations are those of elemental phosphorus with 1,2,3,4,7,8,9,10,13,13,14,14-dodecachloro-1,4,4a,5,6,6a,7,10,10a, 11, 12,12a-dodecahydro-1,4:7,10-dimethanodibenzo(a,e)cyclooctane (Dechlorane® Plus, Occidental Chemical Corp.) and, if desired, a synergist, such as antimony trioxide.

Phosphorus compounds, such as organic phosphates, phosphonates, phosphinates, phosphine oxides, phosphines or phosphites are likewise preferred. Examples are triphenylphosphine oxide and triphenyl phosphate. This can be used alone or mixed with hexabromobenzene or with a chlorinated biphenyl and, if desired, antimony oxide.

Typical of the preferred phosphorus compounds which may be used according to the present invention are those of the formula

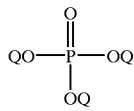

where Q are identical or different hydrocarbon radicals, such as alkyl, cycloalkyl, aryl, alkyl-substituted aryl and aryl-substituted alkyl, or halogen, hydrogen or combinations of these, with the proviso that at least one of the radicals Q is an aryl radical.

Examples of suitable phosphates of this type are the following: phenyl bisdodecyl phosphate, phenyl bisneopentyl phosphate, phenyl ethyl hydrogenphosphate, phenyl bis (3,5,5'-trimethylhexyl) phosphate, ethyl diphenyl phosphate, 2-ethylhexyl di(p-tolyl) phosphate, bis(2-ethylhexyl) phenyl phosphate, tri(nonylphenyl) phosphate, phenyl methyl hydrogenphosphate, di(dodecyl) p-tolyl phosphate, tricresyl phosphate, triphenyl phosphate, dibutyl phenyl phosphate and diphenyl hydrogen-phosphate. The preferred phosphates are those in which each Q is aryl. The most preferred phosphate is triphenyl phosphate. The combination of triphenyl phosphate with hexabromobenzene and antimony trioxide is also preferred.

Other suitable flame retardants are those compounds which contain phosphorus-nitrogen bonds, such as phosphonitrile dichloride, phosphoric ester amides, phosphoric ester amines, phosphoric amides, phosphonic amides, tris (aziridinyl)phosphine oxide and tetrakis(hydroxymethyl)-phosphonium chloride. Most of these flame-retardant additives are commercially available.

Other suitable flame retardants are hydroxides of magnesium, which have been coated with silane compounds if desired.

Other halogen-containing flame retardants are tetrabomobenzene, hexachlorobenzene and hexabromobenzene and halogenated polystyrenes and polyphenylene ethers.

The halogenated phthalimides described in DE-A-19 46 924 may also be used. Of these, N,N'-ethylenebistetrabromophthalimide has gained particular importance.

Examples of other customary additives are stabilizers and oxidation inhibitors, agents to counteract decomposition by heat and decomposition by ultraviolet light, lubricants, mold-release agents, dyes, pigments and plasticizers.

Examples of oxidation inhibitors and heat stabilizers which may be added to the novel molding compositions are halides of metals of group I of the Periodic Table, for example those of sodium, potassium and lithium, if desired in combination with copper(I) halides, such as chlorides, bromides and iodides. Zinc fluoride and zinc chloride may also be used. Other compounds which may be used are sterically hindered phenols, hydroquinones, substituted representatives of this class and mixtures of these compounds, preferably in concentrations of up to 1% by weight, based on the weight of the mixture.

Examples of UV stabilizers are various substituted resorcinols, salicylates, benzotriazoles and benzophenones, which are generally used in amounts of up to 2% by weight.

Lubricants and mold-release agents, which are generally added to the molding composition in amounts of up to 1% by weight, are stearic acid, stearyl alcohol, alkyl stearates, stearamides and esters of pentaerythritol with long-chain fatty acids.

The additives include also stabilizers which prevent the decomposition of the red phosphorus in the presence of moisture and atmospheric oxygen. Examples of these are compounds of cadmium and of zinc, aluminum, silver, iron, copper, antimony, tin, magnesium, manganese, vanadium, boron and titanium. Examples of particularly suitable compounds are oxides of the metals named, and also carbonates and oxycarbonates, hydroxides and salts of organic or inorganic acids, such as acetates, phosphates, hydrogenphosphates and sulfates.

The novel molding compositions may contain, as preferred stabilizer, at least one phosphorus-containing inorganic acid or derivatives thereof in amounts of up to 1000, preferably from 30 to 200 and in particular from 50 to 130 ppm, based on the phosphorus content of the compounds.

Preferred acids are hypophosphorous acid, phosphorous acid and phosphoric acid and salts of these with alkali metals, sodium and potassium being particularly preferred. For the purposes of the invention, organic derivatives of these acids are preferably ester derivatives of the acids mentioned above with fatty acids, the fatty acids having from 12 to 44 carbon atoms, preferably from 22 to 40 carbon atoms. Examples of these are stearic acid, behenic acid, palmitic acid and montanic acid.

Nucleating agents which may be used are sodium phenylphosphinate, alumina, silica, nylon-2,2 and preferably talc.

Lubricants and mold-release agents, which are usually used in amounts of up to 1% by weight, are preferably long-chain fatty acids (for example stearic acid or behenic acid), salts of these (for example calcium stearate or zinc stearate) or ester derivatives (for example stearyl stearate or pentaerythritol tetrastearate) or amide derivatives (for example ethylene bisstearylamide).

Examples of plasticizers are dioctyl phthalates, dibenzyl phthalates, butyl benzyl phthalates, hydrocarbon oils, N-(n-butyl)benzenesulfonamide and o- and p-tolylethylsulfonamide.

Pigments and dyes are generally present in amounts of up to 4% by weight, preferably from 0.5 to 3.5% by weight and in particular from 0.5 to 3.5% by weight.

The pigments for pigmentation of thermoplastics are well known, see for example R. Gächter and H. Müller, Taschenbuch der Kunststoffadditive, Carl Hanser Verlag, 1983, pages 494–510. The first preferred class of pigments are white pigments, such as zinc oxide, white lead ($2PbCO_3.Pb(OH)_2$), lithopones, antimony white and titanium dioxide. Of the two most frequently encountered crystalline modifications of titanium dioxide (rutile and anatase) the rutile form is used in particular for white coloration of the novel molding compositions.

Black pigments which may be used according to the invention are iron oxide black ($Fe_3O_4$), spinnell black ($Cu(Cr,Fe)_2O_4$), manganese black (mixture of manganese dioxide, silica and iron oxide), cobalt black and antimony black, and particularly preferably carbon black, usually in the form of furnace or gas black (see in this connection G. Benzing, Pigmente für Anstrichmittel, Expert-Verlag (1988), pp. 78 ff).

According to the invention, it is also, of course, possible to use inorganic color pigments, such as chromium oxide green, or organic color pigments, such as azo pigments and phthalocyanines, to establish certain hues. Pigments of these types are widely commercially available.

It can also be advantageous to use the pigments and/or dyes mentioned in mixtures, for example carbon black with copper phthalocyanines, since dispersion of color in the thermoplastic generally becomes easier.

Preparation of the Molding Compositions

The invention also provides a process for preparing the molding compositions described above. For this, component A is firstly prepared and then mixed with component B and, if present, components C, D and/or E. The delaminated phyllosilicates of component C may also be introduced during the preparation of component A.

Preference is given to a process for preparing the novel molding compositions by
dissolving components A1 and A2 in water,
condensing the resultant aqueous mixture at a pressure in a range from 1 to 20 bar and at from 200 to 300° C., to give a prepolymer,
post-condensation of the resultant prepolymer by solid phase condensation with superheated steam at a pressure in the range from 0 to 5 bar and at a temperature which is from 5 to 50° C. below the melting point and
mixing the copolyamide A with components B, and if desired C, D and/or E.

The process for preparing component A is preferably carried out continuously. More detailed process conditions, and the implementation of the process, are described in DE-A-33 21 579.

The process may also be carried out discontinously.

Components A to E may be mixed by processes known per se. It can be advantageous to premix individual components.

The components, for example, in dry form, may be mixed by any known methods, but preferably by extruding, kneading or rolling the components together, preferably at from 180 to 320° C. For this, the components may be metered in together or separately/in sequence.

The novel molding compositions can be used for producing moldings, fibers and films.

The moldings, fibers or films here are produced by known processes.

The invention also provides the moldings, fibers or films which are produced from the molding compositions described above.

The invention is described in more detail below, by means of examples.

Preparation of Component A in the Continuous Process

The process described in DE-A 33 21 579 was used for continuous preparation of the copolyamide. Parts are parts by weight.

VN: The viscosity number (VN) was determined using a 0.5% strength solution in 96% strength sulfuric acid at 25° C.

Triamine content: The triamine content was determined directly using HPLC, after complete hydrolysis of the materials, by refluxing for 12 hours with 18% strength hydrochloric acid.

EXAMPLE 1A

3% by weight of component A2

5.622 parts of an equimolar salt of adipic acid and hexamethylenediamine, together with 0.172 parts of a likewise equimolar salt of isophthalic acid and hexamethylenediamine, were dissolved in 3.551 parts of water at 85° C. and metered, using a metering pump, into a polycondensation stage at a rate corresponding to 5 kg/h of copolyamide, converted to a prepolymer within 10 minutes at 285° C. and a pressure of 5 bar, and then returned to atmospheric pressure in a twin-screw extruder at 285° C. and converted into pellets.

The resultant prepolymer had a viscosity number (VN) of 66.8 $cm^3/g$, 145 meq/kg of carboxyl end groups, 145 meq/kg of amino end groups, a bishexamethylenetriamine content of 0.16% and a DSC melting point of 256.5° C.

The prepolymer was post-condensed by continuous solid phase condensation with superheated steam within 8 hours at 188° C., to a final viscosity of VN=145 $cm^3/g$.

EXAMPLE 2A 4.5% by weight of component A2

5.535 parts of an equimolar salt of adipic acid and hexamethylenediamine and 0.258 parts of a likewise equimolar salt of isophthalic acid and hexamethylenediamine were dissolved in 3.55 parts of water at 85° C., as described in Example 1A. The solution was polycondensed as described in Example 1. The resultant prepolymer had a VN of 65.0 $cm^3/g$, 159 meq/kg of carboxyl end groups, 160 meq/kg of amino end groups, a bishexamethylenetriamine content of 0.17% and a DSC melting point of 254.7° C.

The prepolymer was post-condensed by continuous solid phase condensation in accordance with Example 1A. A viscosity number of 147 $cm^3/g$ was obtained, with a residence time of 9 hours at 187° C.

COMPARATIVE EXAMPLE COMP. 1A 6.0% by weight of component A2

In accordance with Example 1A, 5.448 parts of an equimolar salt of adipic acid and hexamethylenediamine and 0.344 parts of a likewise equimolar salt of isophthalic acid and hexamethylenediamine were dissolved in 3.55 parts of water at 85° C. The solution was polycondensed as described in Example 1A. The resultant prepolymer had a VN of 64.0 cm³/g, 163 meq/kg of carboxyl end groups, 164 meq/kg of amino end groups, a bishexamethylenetriamine content of 0.17% and a DSC melting point of 254.2° C.

The polymer was post-condensed by continuous solid-phase condensation in accordance with Example 1A. A viscosity number of 148 cm³/g was obtained with a residence time of 10 hours at 188° C.

COMPARATIVE EXAMPLE COMP. 2A without component A2

In accordance with Example 1A, 5.790 parts of an equimolar salt of adipic acid and hexamethylenediamine were dissolved in 3.55 parts of water at 85° C. The solution was polycondensed as described in Example 1A. The resultant prepolymer had a VN of 69.5 cm³/g, 134 meq/kg of carboxyl end groups, 135 meq/kg of amino end groups, a bishexamethylenetriamine content of 0.13% and a DSC melting point of 257.4° C.

The polymer was post-condensed by continuous solid-phase condensation in accordance with Example 1A. A viscosity number of 146 cm³/g was obtained with a residence time of 8 hours at 188° C.

COMPARATIVE EXAMPLE COMP. 3A 95.5% by weight of nylon-6,6 (VN=120, for example Ultramid® A 25 from BASF AG) and 4.5% by weight of nylon-6,I (VN=72) were compounded in a twin-screw extruder (ZSK 30 from Werner & Pfleiderer) to give a copolyamide having block structure.

COMPARATIVE EXAMPLE COMP. 4A

Component A from EP-A-0 722 986

An aqueous solution of strength about 60% by weight, consisting of terephthalic acid (32.2 mol % ≙ 37.5% by weight), isophthalic acid (17.8 mol % ≙ 20.6% by weight), hexamethylenediamine (48.1 mol % ≙ 39.1% by weight and 1.9 mol % ≙ 2.8% by weight, respectively), bis(4-aminocyclohexyl)methane and 0.174 kg of propionic acid and 100 kg of water was conveyed by means of a metering pump from a heated storage vessel at about 80° C. at a rate corresponding to an amount of polyamide of 5 kg/hour into a tube evaporator having a partly horizontal and partly vertical arrangement. The evaporator was heated, with vigorous circulation, by a liquid heat-carrying medium whose temperature was 326° C. The evaporator had a length of 3 m and a capacity of 180 ml and a heat-transfer surface of about 1300 cm². The residence time in the evaporator was 50 seconds. The mixture of prepolymers and steam emerging from the evaporator had a temperature of 310° C. and was separated in a separator to give steam and melt. The melt remained in the separator for a further 10 minutes and was then discharged in the form of extrudates by means of a discharge screw with evaporation zone, solidified in a water-bath and then pelletized. The separator and the evaporator zone were held at a pressure of 5 bar by means of equipment for maintaining pressure, arranged downstream of the column. The steam separated off in the separator was conveyed to a packed column having about 10 theoretical plates, to the head of which about 1 l per hour of condensed vapors was added to create reflux. The temperature which became established at the column head was 152° C. The steam emerging downstream of the relief valve was condensed, and had a hexamethylenediamine content of less than 0.05% by weight. An aqueous solution of hexamethylenediamine which contained 80% by weight of hexamethylenediamine, based in each case on the polyamide produced, was obtained at the bottom of the column. This solution was added back, via a pump, to the starting salt solution before entry into the evaporator.

After discharge of the polymer melt from the separator, the polyamide had a very pale intrinsic color and a viscosity number of 48 ml/g (measured as 0.5% strength solution in 96% strength by weight $H_2SO_4$ at 25° C., according to DIN 53 246).

The product had an approximately equivalent amount of carboxyl and amino end groups.

In the discharge extruder, the melt was returned to atmospheric pressure and, with a residence time of less than 1 minute, underwent virtually no further post-condensation.

The product was then annealed in batches in the solid phase in a fixed conditioning tube (double-walled glass tube of internal diameter 120 mm and length 1000 mm, externally heated to annealing temperature by means of oil, through which are passed 120 l/min of superheated steam) at 200° C., to a viscosity number of 112 ml/g. The residence time was 23 h. During this annealing, if desired, a large part of the extractable residual monomers was also extracted from the steam.

Formulation:

32.2 mol % or 37.5% by weight of terephthalic acid units 17.8 mol % or 20.6% by weight of isophthalic acid units 48.1 mol % or 39.1% by weight of hexamethylenediamine units 1.9 mol % or 2.8% by weight of bis(4-aminocyclohexyl) methane units The specific heat of fusion $\Delta H_{cryst.}$ was determined, using differential scanning calorimetry (DSC 990, DuPont) at 20° C./min heating rate, as a comparative measure of the degree of crystallinity: 54 J/g.

COMPARATIVE EXAMPLE COMP. 5A

The copolyamide used had 70% by weight of units derived from terephthalic acid and hexamethylenediamine (nylon-6 T) and 30% by weight of units derived from caprolactam (nylon-6). The preparation and measurement of properties were carried out as follows:

An aqueous solution consisting of 35 kg of ε-caprolactam, 55 kg of terephthalic acid, 38.5 kg of hexamethylenediamine and 128.5 kg of water was conveyed by means of a metering pump from a heated storage vessel at about 80° C. at a rate corresponding to an amount of polyamide of 5 kg/hour into a tube evaporator having a partly horizontal and partly vertical arrangement. The evaporator was heated, with vigorous circulation, by a liquid heat-carrying medium whose temperature was 295° C. The evaporator had a length of 3 m and a capacity of 180 ml and a heat-transfer surface of about 1300 cm². The residence time in the evaporator was 50 seconds. The mixture of prepolymers and steam emerging from the evaporator had a temperature of 290° C. and was separated in a separator to give steam and melt. The melt remained in the separator for a further 10 minutes and was then discharged in the form of extrudates by means of a discharge screw with evaporation zone, solidified in a water-bath and then pelletized. The separator and the evaporator zone were held at a pressure of 5 bar by means of equipment for maintaining pressure, arranged downstream of the column. The steam separated off in the separator was conveyed to a packed column having about 10 theoretical plates, to the head of which about 1 l per hour of condensed vapors was added to create reflux. The temperature which became established at the column head was 152° C. The steam emerging downstream of the relief valve was condensed, and had a ε-caprolactam content of less than 0.1% by weight. An aqueous solution of hexamethylenediamine which contained 80% by weight of hexamethylenediamine and from 1 to 3% of ε-caprolactam, based in each case on the polyamide produced, was obtained at the bottom of the column. This solution was added back, via a pump, to the starting salt solution before entry into the evaporator.

Downstream of the evaporator, the prepolymer had a relative viscosity, measured in 98% strength by weight sulfuric acid at 20° C., of 1.25, and end-group analysis showed a converison of from 93 to 95%. The bishexamethylenetriamine content was from 0.1 to 0.15% by weight, based on polyamide.

After discharge of the polymer melt from the separator, the polyamide had a very pale intrinsic color and an extremely low bishexamethylenetriamine content of 0.17%, and a relative viscosity of from 1.65 to 1.80.

The product had an approximately equivalent amount of carboxyl and amino end groups.

The content of extractable fractions (extraction with methanol) was from 3.1 to 3.3% by weight.

The melt was then returned to atmospheric pressure in the discharge extruder, and, with a residence time of less than 1 minute, there was virtually no further post-condensation. The resultant pellets were condensed by continuous solid-phase condensation using superheated steam at 195° C. and with a residence time of 30 hours, to a final viscosity of $\eta_{rel}$=2.50. The content of extractable fractions was then 0.2% by weight (methanol extract).

EXAMPLE 1B (Component B1c)

90% by weight of poly(2,6dimethyl-1,4-phenylene ether) having a reduced specific viscosity of 0.6 ml/g (1% strength by weight in chloroform at 25° C.), 8% by weight of polystyrene (MVI at 200° C. and 5 kg load: 24 g/10 min), 1.95% by weight of fumaric acid and 0.05% by weight of 3,4-dimethyl-3,4-diphenylhexane were metered into a twin-screw extruder (ZSK 30 from Werner & Pfleiderer), melted in a first section using kneading elements, reacted at 280° C. in a second section using kneading elements and then devolatilized in a devolatilizing zone at 300° C. The average residence time in the extruder was 1.5 min.

EXAMPLE 2B (Component B21)

The polypropylene used had an MVI of 2.4 g/10 min (measured according to DIN 53735 at 230° C. and 2.16 kg load) and a melting point of 165° C. (Novolen® 1100H from BASF AG).

EXAMPLE 3B (Component B22)

The polypropylene used (Exxelor® PO 1015 from Exxon) was modified with 0.3% by weight of maleic anhydride.

EXAMPLE 4B (Component B31)

An ABS polymer (Terluran® 967K from BASF AG) obtainable according to Example 1 of DE-A 24 27 960:

The following materials were charged to a V2A steel reactor having a blade stirrer and designed for 10 atmospheres gauge:

150 parts of water,
1.2 parts of the sodium salt of a paraffinsulfonic acid ($C_{12}$–$C_{18}$),
0.3 parts of potassium persulfate,
0.3 parts of sodium bicarbonate,
0.15 parts of sodium pyrophosphate.

To remove the oxygen, the reactor was twice flushed with nitrogen and the solution heated to 65° C. 0.5 parts of tert-dodecyl mercaptan and 16.6 parts of butadiene were then added to the solution. One hour after polymerization had begun, a further 83.3 parts of butadiene were metered in within a period of 5 hours. Five hours after butadiene addition had ended, i.e. after a total of 11 hours, 0.5 parts of tert-dodecyl mercaptan were again added. The total reaction time of 19 hours gave a polybutadiene emulsion having a solids content of 39.2%, based on the emulsion, with a conversion of 96%. The polybutadiene latex had a glass transition temperature of about –80° C. The particle size distribution (integral mass distribution) determined by means of the ultracentrifuge is defined by the following values:

$d_{10}$ 0.06 μm
$d_{50}$ 0.08 μm
$d_{90}$ 0.105 μm 255 parts of the polybutadiene emulsion were diluted at 65° C. with 74 parts of water. 30 parts of an aqueous dispersion of an ethyl acrylate copolymer comprising, as copolymers, 96% by weight of ethyl acrylate and 4% by weight of methylacrylamide were metered in to agglomerate the latex. The solids content of this dispersion was 10% by weight, based on the dispersion. The agglomeration gave a polybutadiene latex in which about 80% of the particles by number were present in non-agglomerated condition. The particle size distribution (integral mass distribution) of the agglomerated polybutadiene latex, measured using the ultracentrifuge, is defmed by the following values:

$d_{10}$ 0.070 μm
$d_{50}$ 0.238 μm
$d_{90}$ 0.323 μm

The resultant polybutadiene emulsion was heated to 70° C. and mixed at this temperature with 0.13 parts of potassium persulfate (in the form of a 3 percent strength aqueous solution), 0.02 parts of tert-dodecyl mercaptan and 11 parts of a mixture of styrene and acrylonitrile. The weight ratio of styrene to acrylonitrile in this mixture was 7:3. Ten minutes after the graft reaction had begun, a mixture of a further 39 parts of styrene, 17 parts of acrylonitrile and 0.1 parts of tert-dodecyl mercaptan was metered in within a period of 2¾ hours. The reaction temperature which became established during this was 75° C. After the monomer addition had ended, the reaction was continued for 1 further hour and the resultant graft polymer was then precipitated at 95° C. using a calcium chloride solution and filtered off. Using an extruder, the moist grafted polybutadiene crumbs were incorporated into the melt of a styrene-acrylonitrile copolymer which comprised 65% by weight of styrene and 35% by weight of acrylonitrile, the grafted polybutadiene being mixed with the styrene-acrylonitrile copolymer in a weight ratio of 3:7.

EXAMPLE 5B (Component B31)

An ASA polymer (Luran® S 778T from BASF AG) obtainable according to DE-A 12 60 135 (comparative Example 1a):

100 parts of butyl acrylate, 50 parts of Emulsifier H (20% strength), 3 parts of potassium persulfate and 1480 parts of distilled water were heated to 60° C., with stirring. After the polymerization had begun, 880 parts of butyl acrylate and 20 parts of butanediol diacrylate were metered in during the course of about 1 hour. Polymerization was continued for 2 hours and gave a polymer dispersion (A) of ~40% strength.

465 parts of styrene and 200 parts of acrylonitrile were polymerized at 60° C., with stirring, in the presence of 2500 parts of dispersion (A), 2 parts of potassium persulfate, 1.33 parts of lauryl peroxide and 1005 parts of distilled water. This gave a 40% strength dispersion, from which the solid product was precipitated by adding a 0.5% strength calcium chloride solution, and washed with water and dried.

1490 parts of the dried polymer were mixed at about 220° C. in a screw-extruder with 2090 parts of a copolymer of 68 parts of styrene and 32 parts of acrylonitrile.

EXAMPLE 6B (Comparative B32)

Use was made of a solution-polymerized random copolymer made from 75% by weight of styrene, 24% by weight of acrylonitrile and 1% by weight of maleic anhydride and having VN=80 ml/g (according to DIN 53 727), measured as 0.5% strength solution in chloroform).

EXAMPLE 7B (Component B1a)

4.593 kg of dichlorodiphenyl sulfone and 3.652 kg of bisphenol A were dissolved in 29 kg of N-methylpyrrolidone under an atmosphere of nitrogen and mixed with 2.923 kg of anhydrous potassium carbonate. The reaction mixture was firstly heated for 1 h at 180° C. and a pressure of 300 mbar, with continuous distilling-off of the water produced in the reaction and of N-methylpyrrolidone, and then reacted further for 6 h at 190° C. After this time, 235 g of 4-fluorophthalic anhydride were added to the mixture and the reaction was continued for 0.2 h at 190° C. After addition of 40 kg of N-methylpyrrolidone, the inorganic constituents were filtered off, and the polymer was then isolated by precipitation in water. After 3 extractions with water, the product was dried under reduced pressure at 160° C., to give a white material. The content of phthalic anhydride end groups was 0.76% by weight, and the viscosity number of the polyarylene ether was 53.4 ml/g.

EXAMPLE 8B (Component B1a)

4.593 kg of dichlorodiphenyl sulfone and 4.002 kg of dihydroxydiphenyl sulfone were dissolved in 29 kg of N-methylpyrrolidone under an atmosphere of nitrogen and mixed with 2.923 kg of anhydrous potassium carbonate. The reaction mixture was firstly heated for 1 h at 180° C. and a pressure of 300 mbar, with continuous distilling-off of the water produced in the reaction and of N-methylpyrrolidone, and then reacted further for 6 h at 190° C. After this time, 235 g of 4-fluorophthalic anhydride were added to the mixture and the reaction was continued for 0.2 h at 190° C. After addition of 40 kg of N-methylpyrrolidone, the inorganic constituents were filtered off, and the polymer was then isolated by precipitation in water. After 3 extractions with water, the product was dried under reduced pressure at 160° C., to give a white material. The content of phthalic anhydride end groups was 0.83% by weight, and the viscosity number of the polyarylene ether was 49.7 ml/g.

EXAMPLE 9B (Component B1b)

The polyaryl ether B1b used was Ultrason® S 2010 (commercial product from BASF AG). This product is defined by a viscosity number of 56 ml/g, measured in 1% strength NMP solution at 25° C., and is built up from bisphenol A and 4,4'-dichlorodiphenyl sulfone. It has essentially chlorine and methoxy end groups.

EXAMPLE 10b (Component B1b)

The polyaryl ether B1b used was Ultrason® E 1010 (commercial product from BASF AG). This product is defined by a viscosity number of 49 ml/g, measured in 1% strength NMP solution at 25° C, and is built up from 4,4'-dihydroxydiphenyl sulfone and 4,4'-dichlorodiphenyl sulfone. It has essentially chlorine and methoxy end groups.

EXAMPLE 1C (Component C1)

Use was made of an EP rubber modified with 0.4% by weight of maleic anhydride (Exxelor® VA 1803 from Exxon).

EXAMPLE 2C (Component C2)

Use was made of a styrene-butadiene block copolymer (Tufprene® A from Asahi Chem.) having a styrene content of 41% by weight and a Shore A Hardness of 87 (according to DIN 53505).

EXAMPLE 1D (Component D)

Glass fibers (CS 3540 from PPG) were used.

EXAMPLE 1E (Component E)

Carbon black (Printex® EP 60 from Degussa) was used.

The components described above were compounded in the amounts given in Tables 1, 2, 3 and 4 in a twin-screw extruder (ZSK 30 from Werner & Pfleiderer) at, respectively, 280° C. and (Table 4) from 300 to 350° C. The blends were passed through a waterbath after extrusion, pelletized and dried. Finally, they were processed to give the corresponding moldings, the temperature of the blends being 310° C. and 350° C., respectively, with a mold temperature of 100° C.

The formulations are stated in Tables 1 to 4 below.

TABLE 1

Formulations of the polyphenylene ether blends and comparative blends in % by weight of components A to E from the examples given

| Blend | A | B | C1 | C2 | D | E |
|---|---|---|---|---|---|---|
| 1 | 39/1A | 25/B1 | — | 5/2C | 30/1D | 1/1E |
| 2 | 39/2A | 25/B1 | — | 5/2C | 30/1D | 1/1E |
| 3 | 34/1A | 25/B1 | 5/1C | 5/2C | 30/1D | 1/1E |
| 4 | 39/2A | 30/B1 | — | — | 30/1D | 1/1E |
| 5 | 49/2A | 30/B1 | — | — | 20/1D | 1/1E |
| Comp.1 | 39/Comp.1A | 25/B1 | — | 5/2C | 30/1D | 1/1E |
| Comp.2 | 39/Comp.2A | 25/B1 | — | 5/2C | 30/1D | 1/1E |
| Comp.3 | 39/Comp.3A | 25/B1 | — | 5/2C | 30/1D | 1/1E |

TABLE 2

Formulations of the polyolefin blend and comparative blends in % by weight of components A to E from the examples given

| Blend | A | B21 | B22 | C1 | D | E |
|---|---|---|---|---|---|---|
| 6 | 40/A1 | 20/2B | 5/3B | 4/1C | 30/1C | 1/1E |
| Comp. 4 | 40/Comp.1A | 20/2B | 5/3B | 4/1C | 30/1D | 1/1E |
| Comp. 5 | 40/Comp.2A | 20/2B | 5/3B | 4/1C | 30/1D | 1/1E |
| Comp. 6 | 40/Comp.3A | 20/2B | 5/3B | 4/1C | 30/1D | 1/1E |
| Comp. 7 | 40/Comp.4A | 20/2B | 5/3B | 4/1C | 30/1D | 1/1E |
| Comp. 8 | 40/Comp.5A | 20/2B | 5/3B | 4/1C | 30/1D | 1/1E |

TABLE 3

Formulations of the ABS and ASA blends and comparative blends in % by weight of components A to E from the examples given

| Blend | A | B31 | B32 | C1 | D | E |
|---|---|---|---|---|---|---|
| 7 | 40/1A | 30/4B | — | — | 30/1D | — |
| 8 | 40/2A | 30/4B | — | — | 30/1D | — |
| 9 | 35/1A | 30/5B | — | 5/1C | 30/1D | — |
| 10 | 35/1A | 25/5B | 5/6B | 5/1C | 30/1D | — |
| 11 | 39/2A | 30/5B | 5/6B | 5/1C | 20/1D | 1/1E |
| Comp. 9 | 40/Comp.1A | 30/4B | — | — | 30/1D | — |
| Comp. 10 | 40/Comp.2A | 30/4B | — | — | 30/1D | — |
| Comp. 11 | 40/Comp.3A | 30/4B | — | — | 30/1D | — |
| Comp. 12 | 40/Comp.4A | 30/4B | — | — | 30/1D | — |

TABLE 4

Formulations of the polyarylene ether blends and comparative blends in % by weight of components A to E from the examples given

| Blend | A | B1a | B1b | C | D | E |
|---|---|---|---|---|---|---|
| 12 | 28/1A | — | 41/9B | — | 30/1D | 1/1E |
| 13 | 28/2A | — | 41/9B | — | 30/1D | 1/1E |
| 14 | 28/1A | 10/7B | 31/9B | — | 30/1D | 1/1E |
| 15 | 24/1A | 10/7B | 31/9B | 4/1C | 30/1D | 1/1E |
| 16 | 28/2A | — | 41/10B | — | 30/1D | 1/1E |
| 17 | 28/2A | 10/8B | 31/10B | — | 30/1D | 1/1E |
| Comp. 13 | 28/Comp.1A | — | 41/9B | — | 30/1D | 1/1E |
| Comp. 14 | 28/Comp.2A | — | 41/9B | — | 30/1D | 1/1E |
| Comp. 15 | 28/Comp.3A | — | 41/9B | — | 30/1D | 1/1E |
| Comp. 16 | 28/Comp.2A | — | 41/10B | — | 30/1D | 1/1E |

To test the properties of the molding compositions, a tensile test was carried out according to ISO 527. Gloss, as a measure of surface quality, was determined according to DIN 67530, moldings according to ISO 6603-2 being used. Depending on its quality, the surface was classified as good (+), satisfactory (0) or unsatisfactory (−). The Charpy impact strength without notch (aN) was determined according to ISO 179. The values were determined before and after heat-aging the test specimens in air at 110° C.

For the polyarylene ethers, the following additional measurements were carried out:

The Vicat softening point was used to determine the heat resistance of the specimens. The Vicat softening point was determined according to DIN 53 460 on standard small specimens, using a force of 49.05 N and an increase in temperature of 50 K per hour. The impact strength of the materials was determined on ISO specimens according to ISO 179 leU. Stiffness (modulus of elasticity) was determined according to DIN 53 457 and tensile strength according to DIN 53 455. The values were determined before and after heat-aging the specimens at 110° C. in air. Warpage was determined on small test boxes, by measuring the width of the open side at the end and in the middle of the box and dividing the difference between these values by 2. 5 specimens were tested in each case, and the average is given in Table 7.

TABLE 5

Properties of the polyphenylene ether blends and comparative blends

| Blend | Elongation at break [%] | Modulus of elasticity [N/m$^2$] | Suface quality | aN [kJ/m$^2$] fresh from molding | aN [kJ/m$^2$] after 30 days | aN [kJ/m$^2$] after 60 days |
|---|---|---|---|---|---|---|
| 1 | 3.0 | 9050 | + | 55 | 34 | 25 |
| 2 | 2.8 | 8900 | + | 52 | 35 | 23 |
| 3 | 3.5 | 8450 | + | 62 | 38 | 27 |
| 4 | 2.1 | 9200 | + | 45 | 33 | 23 |
| 5 | 3.3 | 7600 | + | 58 | 37 | 26 |
| Comp. 1 | 2.2 | 8700 | − | 50 | 21 | 16 |
| Comp. 2 | 2.8 | 9000 | − | 48 | 22 | 17 |
| Comp. 3 | 2.4 | 8750 | 0 | 50 | 18 | 16 |

TABLE 6

Properties of the polyolefin blend and comparative blends

| Blend | Elongation at break [%] | Modulus of elasticity [N/mm$^2$] | Suface quality |
|---|---|---|---|
| 6 | 4.2 | 7750 | + |
| Comp. 4 | 3.5 | 7800 | 0 |
| Comp. 5 | 3.9 | 7700 | 0 |
| Comp. 6 | 4.3 | 7550 | 0 |
| Comp. 7 | 3.1 | 7800 | 0 |
| Comp. 8 | 4.2 | 7600 | 0 |

TABLE 7

Properties of the ABS and ASA blends and comparative blends

| Blend | Elongation at break [%] | Modulus of elasticity [N/mm$^2$] | Suface quality |
|---|---|---|---|
| 7 | 3.9 | 8250 | + |
| 8 | 3.7 | 8000 | + |
| 9 | 4.3 | 7600 | + |
| 10 | 4.6 | 7700 | + |
| 11 | 4.4 | 6400 | + |
| Comp. 9 | 3.7 | 8100 | − |
| Comp. 10 | 4.2 | 8100 | − |
| Comp. 11 | 4.0 | 7900 | 0 |
| Comp. 12 | 3.5 | 8050 | 0 |

TABLE 8

Properties of the polyarylene ether blends and comparative polyarylene ether blends

| Blend | Vicat B [° C.] | aN [kJ/m$^2$] | Modulus of elasticity [N/mm$^2$] | $\sigma_R$ [N/mm$^2$] | Modulus of elasticity after [N/mm$^2$] | $\sigma_R$ after [N$^2$] | Surface quality | Warpage [cm] |
|---|---|---|---|---|---|---|---|---|
| 12 | 181 | 47 | 9600 | 173 | 9500 | 154 | + | 0.03 |
| 13 | 181 | 45 | 9450 | 171 | 9400 | 151 | + | 0.03 |
| 14 | 181 | 51 | 9500 | 182 | 9400 | 161 | + | 0.02 |
| 15 | 179 | 59 | 9100 | 172 | 9000 | 150 | + | 0.03 |
| 16 | 205 | 43 | 9700 | 176 | 9550 | 155 | + | 0.02 |
| 17 | 205 | 48 | 9650 | 184 | 9400 | 163 | + | 0.02 |
| Comp. 13 | 180 | 41 | 9300 | 164 | 9200 | 131 | − | 0.05 |
| Comp. 14 | 181 | 38 | 9100 | 165 | 9000 | 126 | − | 0.05 |
| Comp. 15 | 180 | 37 | 9200 | 159 | 8900 | 121 | 0 | 0.05 |
| Comp. 16 | 203 | 38 | 9400 | 161 | 9000 | 129 | − | 0.04 |

We claim:

1. A molding composition comprising components A, B and, if desired, components C and D, the total weight of which is 100% by weight:
   a: as component A, from 5 to 95% by weight of a random copolyamide made from
      a1: from 95.5 to 99.9% by weight of component A1 made from equimolar amounts of at least one linear aliphatic diamine and at least one linear aliphatic dicarboxylic acid
      a2: from 0.1 to 4.5% by weight of component A2 made from equimolar amounts of at least one linear aliphatic diamine and isophthalic acid
   b: as component B, from 5 to 95% by weight of a component B, different from component A, selected from:
      b1: component B1 made from at least one polyarylene ether, or
      b2: component B2 made from, as component B21, from 60 to 99% by weight of at least one polyolefin homo- or copolymer and, as component B22, from 1 to 40% by weight of at least one polyolefin homo- or copolymer modified by incorporation of at least one monomer which contains a member selected from the group consisting of carboxy, anhydride, amide, imide, carboxylic ester, amino, hydroxyl, epoxy, oxazolyl, urethane, urea, lactam and which has a double bond, or
      b3: component B3 made from, as component B31, from 70 to 100% by weight of at least one SAN, ABS or ASA polymer and, as component B32, from 0 to 30% by weight of at least one SAN, ABS or ASA polymer modified by the incorporation of at least one carbonyl, anhydride, amide, imide, carboxylic ester, carboxyl, amino, hydroxyl, epoxy, oxazoline, urethane, urea, lactam or halobenzyl group
   c: as component C, from 0 to 20% by weight of at least one impact modifier not covered by components B21, B22, B31 or B32, and
   d: as component D, from 0 to 50% by weight of at least one filler.

2. The molding composition of claim 1, wherein, in component A, the proportion of component A1 is from 95.5 to 98.5% by weight and the proportion of component A2 is from 1.5 to 4.5% by weight.

3. The molding composition of claim 1, wherein component A has a viscosity number of from 70 to 300.

4. The molding composition of claim 1, wherein the proportion of component B is from 5 to 90% by weight and the proportion of component D is from 5 to 50% by weight.

5. The molding composition of claim 1, wherein the molding composition contains, as component D, a delaminated phyllosilicate.

6. The molding composition of claim 1, wherein component B1 is a polyphenylene ether B1c which is built up by reacting
   b11: as component B11, from 70 to 99.95% by weight of at least one unmodified polyphenylene ether,
   b12: as component B12, from 0 to 29.95% by weight of at least one polymer of vinylaromatic monomers,
   b13: as component B13, from 0.05 to 30% by weight of at least one monomer capable of reacting with components B11 and B12 and which carries at least one carbonyl, carboxy, anhydride, amide, imide, carboxyl, carboxylate, amino, hydroxyl, epoxy, oxazoline, urethane, urea, lactam or halobenzyl group, B14: as component B14, from 0 to 5% by weight of at least one free-radical initiator, where the totals of the amounts of components B11, B13 and, if present, B12 and/or B14, are 100% by weight.

7. A process for preparing the molding composition defined in claim 1, which comprises dissolving components A1 and A2 in water, condensing the resultant aqueous mixture at a pressure in a range from 1 to 20 bar and at from 200 to 300° C., to give a prepolymer, post-condensing the resultant prepolymer by solid phase condensation with superheated steam at a pressure in the range from 0 to 5 bar and at a temperature which is from 5 to 50° C. below the melting point to obtain copolyamide A and mixing the copolyamide A with components B, and optionally C and/or D.

8. A molding, a fiber or a film made from the molding composition defined in claim 1.

9. A molding composition comprising components A, B and, if desired, components C and D, the total weight of which is 100% by weight:

a: as component A, from 5 to 95% by weight of a random copolyamide made from
   a1: from 95.5 to 99.9% by weight of component A1 made from equimolar amounts of at least one linear aliphatic diamine and at least one linear aliphatic dicarboxylic acid
   a2: from 0.1 to 4.5% by weight of component A2 made from equimolar amounts of at least one linear aliphatic diamine and isophthalic acid b: as component B, from 5 to 95% by weight of a component B, different from component A, selected from b1 and b3, wherein
   b1: is component B1 made from at least one polyarylene ether, and
   b3: is component B3 made from, as component B31, from 70 to 100% by weight of at least one SAN, ABS or ASA polymer and, as component B32, from 0 to 30% by weight of at least one SAN, ABS or ASA polymer modified by the incorporation of at least one carbonyl, anhydride, amide, imide, carboxylic ester, carboxyl, amino, hydroxyl, epoxy, oxazoline, urethane, urea, lactam or halobenzyl group c: as component C, from 0 to 20% by weight of at least one impact modifier not covered by components B21, B22, B31 or B32, and d: as component D, from 0 to 50% by weight of at least one filler.

10. The molding composition of claim 9, wherein, in component A, the proportion of component A1 is from 95.5 to 98.5% by weight and the proportion of component A2 is from 1.5 to 4.5% by weight.

11. The molding composition of claim 9, wherein component A has a viscosity number of from 70 to 300.

12. The molding composition of claim 9, wherein the proportion of component B is from 5 to 90% by weight and the proportion of component D is from 5 to 50% by weight.

13. The molding composition of claim 9, wherein the molding composition contains, as component D, a delaminated phyllosilicate.

14. The molding composition of claim 9, wherein component B1 is a polyphenylene ether B1c which is built up by reacting
   b11: as component B11, from 70 to 99.95% by weight of at least one unmodified polyphenylene ether,
   b12: as component B12, from 0 to 29.95% by weight of at least one polymer of vinylaromatic monomers,
   b13: as component B13, from 0.05 to 30% by weight of at least one monomer capable of reacting with components B11 and B12 and which carries at least one carbonyl, carboxy, anhydride, amide, imide, carboxyl, carboxylate, amino, hydroxyl, epoxy, oxazoline, urethane, urea, lactam or halobenzyl group, B14: as component B14, from 0 to 5% by weight of at least one free-radical initiator, where the totals of the amounts of components B11, B13 and, if present, B12 and/or B14, are 100% by weight.

15. A process for preparing the molding composition defined in claim 9, which comprises dissolving components A1 and A2 in water, condensing the resultant aqueous mixture at a pressure in a range from 1 to 20 bar and at from 200 to 300° C., to give a prepolymer, post-condensing the resultant prepolymer by solid phase condensation with superheated steam at a pressure in the range from 0 to 5 bar and at a temperature which is from 5 to 50° C. below the melting point to obtain copolyamide A and mixing the copolyamide A with components B, and optionally C and/or D.

16. A molding, a fiber or a film made from the molding composition defined in claim 9.

* * * * *

UNITED STATES PATENT AND TRADEMARK OFFICE
CERTIFICATE OF CORRECTION

PATENT NO. : 6,284,830 B1　　　　　　　　　　　　　　　　　　　　　Page 1 of 1
DATED : September 4, 2001
INVENTOR(S) : Gottschalk et al.

It is certified that error appears in the above-identified patent and that said Letters Patent is hereby corrected as shown below:

<u>Title page,</u>
Item [57], "polyolefm" should be -- polyolefin --.

Signed and Sealed this

Twenty-sixth Day of February, 2002

Attest:

JAMES E. ROGAN
*Attesting Officer*　　　*Director of the United States Patent and Trademark Office*